United States Patent
Merrill

(10) Patent No.: US 10,460,764 B2
(45) Date of Patent: *Oct. 29, 2019

(54) UTILIZING AUDIO DIGITAL IMPACT TO CREATE DIGITAL MEDIA PRESENTATIONS

(71) Applicant: Adobe Inc., San Jose, CA (US)

(72) Inventor: Peter Merrill, Sunnyvale, CA (US)

(73) Assignee: Adobe Inc., San Jose, CA (US)

(*) Notice: Subject to any disclaimer, the term of this patent is extended or adjusted under 35 U.S.C. 154(b) by 91 days.

This patent is subject to a terminal disclaimer.

(21) Appl. No.: 15/698,479

(22) Filed: Sep. 7, 2017

(65) Prior Publication Data

US 2017/0372755 A1 Dec. 28, 2017

Related U.S. Application Data

(63) Continuation of application No. 14/841,262, filed on Aug. 31, 2015, now Pat. No. 9,786,327.

(51) Int. Cl.
*G06F 17/00* (2019.01)
*G11B 27/30* (2006.01)
(Continued)

(52) U.S. Cl.
CPC ............ *G11B 27/30* (2013.01); *G11B 27/034* (2013.01); *G11B 27/10* (2013.01); *G11B 27/28* (2013.01);
(Continued)

(58) Field of Classification Search
CPC ....... G11B 27/30; G11B 27/034; G11B 27/28; H04N 5/06; G10L 25/21
See application file for complete search history.

(56) References Cited

U.S. PATENT DOCUMENTS

2011/0054648 A1* 3/2011 Maxwell ............... G10H 1/40
700/94
2013/0139673 A1* 6/2013 Ellis .................... G10H 1/40
84/609
(Continued)

OTHER PUBLICATIONS

Examination Report as received in GB1611042.1 dated Nov. 1, 2016.
(Continued)

*Primary Examiner* — Fan S Tsang
*Assistant Examiner* — David Siegel
(74) *Attorney, Agent, or Firm* — Keller Jolley Preece

(57) ABSTRACT

Systems and methods disclosed create one or more digital media presentations based on impact values. In particular, in one or more embodiments, systems and methods generate impact values based on a change in a measure of energy associated with digital audio content over time. For instance, systems and methods generate impact values by calculating a difference in a measure of energy over time in relation to the amount of energy at a particular time period. Based on the generated impact values, systems and methods identify transition points in the digital audio content. Specifically, systems and methods utilize a decaying masking threshold to identify transition points from generated impact values. Moreover, systems and method utilize identified transition points to modify digital visual content displayed in conjunction with the digital audio content.

20 Claims, 12 Drawing Sheets

(51) Int. Cl.
  *G11B 27/034*  (2006.01)
  *H04N 21/43*  (2011.01)
  *H04N 21/85*  (2011.01)
  *H04N 21/8547*  (2011.01)
  *G11B 27/10*  (2006.01)
  *G11B 27/28*  (2006.01)

(52) U.S. Cl.
  CPC ..... *H04N 21/4302* (2013.01); *H04N 21/4307* (2013.01); *H04N 21/85* (2013.01); *H04N 21/8547* (2013.01)

(56) References Cited

U.S. PATENT DOCUMENTS

2016/0019932 A1 1/2016 Sakunkoo et al.
2017/0062011 A1 3/2017 Merrill

OTHER PUBLICATIONS

U.S. Appl. No. 14/841,262, filed Jan. 26, 2017, Preinterview 1st Office Action.
U.S. Appl. No. 14/841,262, filed Jun. 7, 2017, Notice of Allowance.
Examination Report as received in GB1611042.1 dated Dec. 6, 2018.

\* cited by examiner

UTILIZING AUDIO DIGITAL IMPACT TO CREATE DIGITAL MEDIA PRESENTATIONS

CROSS REFERENCE TO RELATED APPLICATIONS

The present application is a continuation of U.S. application Ser. No. 14/841,262, filed Aug. 31, 2015. The aforementioned application is hereby incorporated by reference in its entirety.

BACKGROUND

1. Technical Field

The present disclosure relates generally to digital media presentations. More specifically, one or more embodiments of the present disclosure relate to systems and methods that generate digital media presentations by synchronizing digital visual content with digital audio content.

2. Background and Relevant Art

In recent years, access to computing devices and digital media have rapidly increased. Indeed, individuals now commonly have access to personal computers, tablets, phones, cameras, televisions, and other computing devices that allow individuals to access digital media from a variety of sources. The increasing prevalence of such devices has not only advanced individual access to digital media, it has also expanded the ability of individuals to capture and create digital media. For example, it is now commonplace for individuals to capture images, video, and other digital content and share such media with others via the Internet.

In light of these advances in accessing, capturing, and sharing digital media, individuals are increasingly searching for new, entertaining means to present digital media to others. To address this demand, some common media presentation systems have been developed that display digital visual content together with digital audio content (e.g., a slide show of a series of photos set to music). For example, some common media presentation systems display a series of photos for a pre-determined amount of time while playing a track of music in the background. Similarly, other common media presentation systems allow a user to manually arrange a series of photos in comparison to a music track—the systems then display the series of photos according to the manual arrangement while playing the music track.

Although such common media presentation systems provide a means for displaying visual media, such systems have their own problems and limitations. For example, users of common media presentation systems that display digital visual content for a pre-determined amount of time commonly complain that such media presentation systems are boring, predictable, and lacking in creativity, emotion, and soul. Moreover, common media presentation systems that display digital visual content for a pre-determined amount of time often display digital visual content in a manner that conflicts with the digital audio content.

In addition, common media presentation systems that allow users to manually place digital visual media in relation to audio media introduce their own problems. Although such systems may allow a user to combine digital visual media with digital audio media in a more artistic and creative manner, such systems generally take a significant amount of time, attention, and/or expertise to use. Accordingly, users routinely become frustrated with the investment in time and effort required to operate such systems. Moreover, such systems often fail to provide entertaining digital media presentations with regard to individual users lacking time, creativity, skill, or experience.

These and other problems exist with regard to creating digital media presentations using conventional systems and methods.

BRIEF SUMMARY

Embodiments of the present disclosure provide benefits and/or solve one or more of the foregoing or other problems in the art with systems and methods that synchronize audio and visual content to create digital media presentations. In particular, in one or more embodiments, disclosed systems and methods calculate impact values that approximate the impact of digital audio content on a listener. Based on the impact values, the systems and methods identify transition points (e.g., impactful time periods in music). The systems and methods then create digital media presentations by synchronizing digital visual content to digital audio content based on the identified transition points.

For example, one or more embodiments include systems and methods that calculate impact values for time periods associated with digital audio content by calculating a change in a measure of energy associated with the time periods. The disclosed systems and methods select transition points based on the impact values in the digital audio content using a decaying masking threshold. Specifically, in one or more embodiments the decaying masking threshold decays until a first impact value is intersected, increases in response to the intersection of the first impact value, and decays again until a second impact value is intersected. The disclosed systems and methods utilize the intersected impact values to select transition points. Moreover, the systems and methods generate a presentation of digital visual content by syncing the digital visual content with the digital audio content based on the selected transition points.

By utilizing impact values to identify transition points, the disclosed systems and methods can present digital visual content in a manner that corresponds to the energy and emotion of the digital audio content. Thus, for example, the disclosed systems and methods can modify digital visual content to correspond to variations in the audio content, creating a digital media presentation that is more emotive, inventive, and entertaining.

In addition, by utilizing a decaying masking threshold to identify transition points, systems and methods can avoid repetitive, predictable, or clustered transitions in digital media presentations. In particular, by using a decaying masking threshold, systems and methods can identify transition points corresponding to particularly significant points in the digital audio content. Similarly, by utilizing a decaying masking threshold, systems and methods can limit predictable, repetitive transitions while reducing clustered transitions that upset a user's visual or auditory capabilities or preferences.

Moreover, by utilizing digital impact values to identify transition points, the disclosed systems and methods can dramatically reduce the time and effort required to generate digital media presentations. Indeed, in one or more embodiments, a user can simply select digital visual content and digital audio content, and, in a matter of seconds, generate a digital media presentation capable of displaying digital visual content in conjunction with digital audio content in an entertaining, innovative manner.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
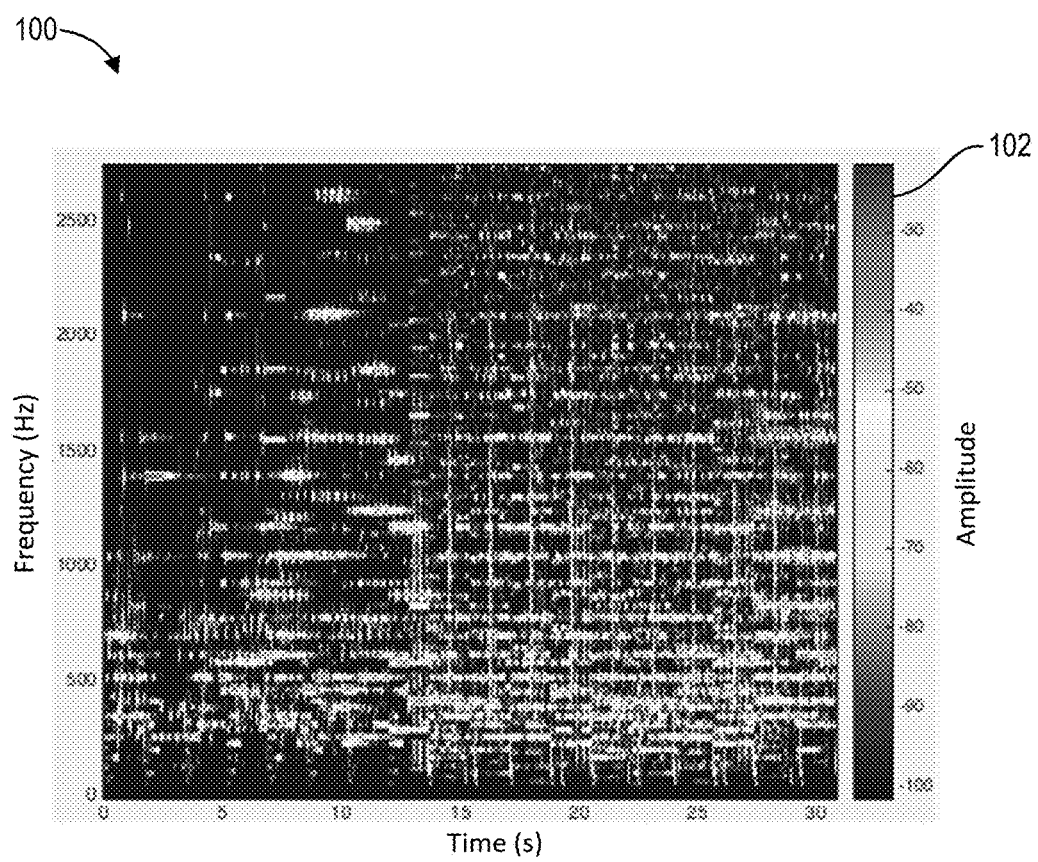
FIG. 1 illustrates a spectrogram reflecting digital audio content in accordance with one or more embodiments.

One or more embodiments of the present disclosure include a digital media presentation system. In particular, one or more embodiments include a digital media presentation system that synchronizes audio content and video content to create a digital media presentation. Specifically, in one or more embodiments, the digital media presentation system calculates impact values related to digital audio content and utilizes impact values to identify transition points. Moreover, the digital media presentation system synchronizes the digital visual content and digital audio content based on the identified transition points.

For example, in one or more embodiments the digital media presentation system calculates impact values for a plurality of time periods associated with digital audio content by calculating a change in a measure of energy associated with the times periods. The digital media presentation system then selects transition points based on the impact values in the digital audio content using a decaying masking threshold. Specifically, the decaying masking threshold decays until intersecting a first impact value, increases in response to the intersection of the first impact value, and decays again until intersecting a second impact value. In one or more embodiments, the digital media presentation system utilizes the intersected impact values to select transition points. Moreover, the digital media presentation system generates a presentation of digital visual content by syncing the digital visual content with the digital audio content based on the selected transition points.

In one or more embodiments, the digital media presentation system calculates impact values to approximate the impact experienced by an individual listening to digital audio content. In other words, impact values can indicate significant time periods in digital audio content. The digital media presentation system calculates impact values by transforming digital audio content into data reflecting a measure of energy associated with the digital audio content and analyzing changes in the measure of energy. In particular, in one or more embodiments the digital media presentation system calculates impact values based on the change in a measure of energy associated with the digital audio content over time. For example, in at least one embodiment, the digital media presentation system calculates a difference in a measure of energy at two time periods in relation to the amount of energy present at the second time period.

The digital media presentation system can calculate impact values with regard to measures of energy associated with particular aspects of the digital audio content. For example, in one or more embodiments the digital media presentation system applies one or more filters to isolate particular measures of energy, such as, percussive energy, harmonic energy, or lyrical energy. Moreover, the digital media presentation system can calculate impact values and transition points specific to these particular measures of energy. In this manner, the digital media presentation system can emphasize transitions that are more emotional (e.g., based on harmonic energy in digital audio content) or more exciting and rhythmic (e.g., based on percussive energy in digital audio content).

By calculating impact values, the digital media presentation system can approximate energy variations in the digital audio content experienced by a user listening to the digital audio content. Accordingly, impact values provide a useful measure in selecting transition points. That being said, the raw impact values themselves might fail to identify desirable transition points because of human audio or visual capabilities or preferences. Indeed, even if a particular moment in digital audio content is associated with a high impact value, a variety of factors can make a transition point unsuitable as a transition point.

For example, providing a transition at every significant event in digital audio content often results in expected, routine transition points. Thus, although a particular time period may have a high impact value, utilizing every high impact value as a transition point may result in a digital media presentation that a user perceives as boring, monotonous, and dull.

Similarly, a significant event in digital audio content tends to reduce (for a time) the relative impact of future events. For example, a crescendo tends to make subsequent rhythmic percussion seem insignificant to a listener for a duration of time. Thus, although some time periods may have high impact values, the relative impact experienced by a listener may be much lower because of a preceding significant event in the digital audio content.

Accordingly, in one or more embodiments the digital media representation system applies a decaying masking threshold. The decaying masking threshold helps reduce repetitive, expected transition points while also accounting for the relative reduction in impact experienced by listeners after a significant impact event in the digital audio content.

Specifically, the decaying masking threshold is a threshold that changes over time. As mentioned above, in one or more embodiments the decaying masking threshold decays until the decaying masking threshold intersects one or more impact values. In response to the intersection, the decaying threshold expands (e.g., increases) momentarily. After increasing, the decaying masking threshold then decays until the decaying masking threshold intersects with one or more additional impact values. In one or more embodiments, the digital media presentation system identifies audio interest values (e.g., potential transition points), based on the intersected impact values while avoiding repetitive, expected transition points and taking into account the relative reduction in impact experienced by a user after significant impact events.

In addition, the digital media presentation system can also select transition points while accounting for visual limitations, capabilities, and preferences. For example, many viewers of digital media presentations have difficulty processing changes in digital visual content at (or above) a certain rate of change. Similarly, after a change in digital visual content, users tend to experience a heightened interest that decreases over time. In one or more embodiments, the digital media presentation system accounts for visual capabilities and preferences by applying another decaying masking threshold.

In particular, in one or more embodiments the digital media presentation system applies a second decaying masking threshold (e.g., applies the second decaying masking threshold to impact values that have been modified utilizing the decaying masking threshold discussed above). For example, the digital media presentation system applies a second decaying masking threshold with different properties than the initial decaying masking threshold. The digital media presentation system applies a second decaying masking threshold with parameters that approximate individual visual capabilities or preferences.

Notably, visual capabilities or preferences often differ depending on features of the particular digital visual content being displayed. For example, the rate at which individuals can comfortably absorb changes in digital visual content will often depend on features of the digital visual content. For instance, individuals can generally process multiple images containing representations of the same person more quickly than multiple images containing representations of multiple different people. Accordingly, the digital media presentation system can detect features of digital visual content and adjust its operation based on the features of the digital visual content. For example, the digital media presentation adjusts the decay rate of a decaying masking threshold depending on the features of the digital visual content (e.g., a determination that two images contain representations of the same person). Aside from adjusting parameters related to a decaying masking threshold based on the features of digital visual content, the digital media presentation system can adjust various parameters in response to a variety of other factors.

Upon applying one or more decaying masking thresholds, in one or more embodiments the digital media presentation system provides/creates one or more digital media presentations. In particular, the digital media presentation systems syncs digital audio content and digital visual content utilizing the transition points. For example, in one or more embodiments the digital media presentation system displays a first visual digital content item while playing digital audio content, and upon reaching a transition point in the digital audio content, the digital media presentation displays a second visual digital content item.

In one or more embodiments, the digital media presentation can also select various transition effects for syncing digital visual content with digital audio content. For instance, a transition effect can comprise an immediate change from one image to another, a fade from one image to another, a transitional video segment between images, or other transition types. One or more embodiments of the digital media presentation can select a transition effect based on the digital audio content. For instance, in one or more embodiments, the digital media presentation compares the duration of a transition effect to the duration of an audio event triggering the transition point to select a transition type for the digital media presentation.

As used herein, the term "digital visual content" refers to any digital visual media. In particular, digital visual content includes digital images, digital photos, digital video, GIFs, or any other digital media capable of being presented for display. Digital visual content includes digital visual media of any format or type, including, but not limited to, JPEG, TIFF, PDF, BMP, PNG, RIF, MOV, WMV, MP4, MPG, M4V, RM, AVI, or FLV. Digital visual content can also include a collection of digital visual media. For example, digital visual content may include a gallery of images and video stored on a mobile device, a group of images stored on a remote server (e.g., a cloud), or some other collection. Moreover, digital visual content may comprise a subset of a larger collection, such as a plurality of images selected by a user from a photo gallery on a mobile device.

As used herein, the term "digital audio content" refers to any digital audio media. In particular, digital audio content includes digital music, digital audio recordings, digital audio tracks, or other digital audio media. Digital audio content includes digital audio media of any format or type, including, but not limited to WAV, WV, M4A, MPEG, WMA, or MP3. Digital audio content may also include the audio portion of another type of media. For example, an audio track to a movie. Thus, digital audio content includes the audio portion of any variety of digital video formats, including, but not limited to, MOV, WMV, MP4, MPG, M4V, RM, AVI, or FLV. Digital audio content may include a collection of sound tracks, such as a playlist, a collection of music burned on a compact disc, a music library, or any other collection. Similarly, digital audio content may comprise a subset of a larger collection, such as a plurality of songs selected by a user from a larger music library on a mobile device.

As used herein, the term "measure of energy" refers to any value representing the energy, intensity, power, amplitude, volume, or loudness associated with digital audio content.

For example, the term measure of energy includes the amplitude attributable to a particular frequency range at a particular point in time with regard to digital audio content. The term measure of energy includes measurements in a variety of units, including, but not limited to, N/m2, Watts, W/m2, decibels, phon, sone, or other units. The term measure of energy also includes measurements with no units at all, such as a measure of energy that has been normalized. For example, the term measure of energy would include a normalized amplitude value expressed as a ratio of some other amplitude value (e.g., normalized with respect to a centroid value).

As used herein, the term "impact value" refers to a value representing the change in a measure of energy associated with digital audio content over time. For instance, the term impact value includes a measure of a change in energy over time in relation to a measure of energy associated with a period of time. The impact value may be calculated using a variety of methods, as described herein.

As used herein, the term "transition point" refers to a point in time (or a period of time) for modifying presentation of digital visual content in relation to digital audio content. The term transition point includes changing from displaying a first image to displaying a second image over a period of time in relation to digital audio content. The term transition point also includes a point in time for changing from displaying a first portion of a video sequence to displaying a second portion of a video sequence; changing from displaying an image to displaying a video sequence; changing from displaying an image to displaying the image with one or more applied effects (e.g., change in color; change in zoom; change in position with regard to a display); displaying a transition effect (e.g., a fade in or fade out; displaying a transition video sequence; or displaying transition text); or other modifications of digital visual content in relation to digital audio content.

Turning now to FIG. 1, additional detail will be provided regarding operation of the digital media presentation system. As mentioned above, in one or more embodiments, the digital media presentation system converts digital audio content into data reflecting a measure of energy attributable to digital audio content over time. FIG. 1 illustrates a spectrogram 100 with regard to a portion of digital audio content to be used in a digital media presentation. In particular, the spectrogram 100 presents variations in amplitude of particular frequencies with regard to the digital audio content over time. The spectrogram 100 represents time associated with the digital audio content along the x-axis, frequencies associated with the digital audio content along the y-axis, and amplitudes of the various frequencies at particular time periods utilizing shading, according to a shading scale 102. Accordingly, each shade in the spectrogram 100 represents an amplitude of the song at a particular frequency at a particular time period.

Although the y-axis of the spectrogram 100 illustrates frequency in Hz, it will be appreciated that the spectrogram 100 can utilize some other measure, including some other unit of frequency. Similarly, although the spectrogram 100 illustrates variations in amplitude, it will be appreciated that the spectrogram 100 can include any measure of energy. For instance, the spectrogram 100 (e.g., the shading scale 102) can utilize any amount of energy, intensity, power, amplitude, volume, or loudness associated with digital audio content.

In one or more embodiments, the digital media presentation system generates the spectrogram 100 by applying a frequency weighting to the digital audio content to account for relative loudness perceived by the human ear. For example, in one or more embodiments, the digital media presentation system applies A-weighting to the song to generate the spectrogram 100. In alternative embodiments, the digital media presentation system may apply a B-weighting, a C-weighting, a D-weighting, a Z-weighting curve, or an alternative frequency weighting. The spectrogram 100 reflects the song after application of an A-weighting curve.

Moreover, one or more embodiments generate the spectrogram 100 by mapping values into ranges. In particular, the digital media presentation system divides digital audio content into any number or variety of frequency ranges. For instance, one or more embodiments utilize 2048 frequency ranges of differing sizes. In particular, one or more embodiments utilize smaller ranges at lower frequencies and larger ranges at higher frequencies. For example, one or more embodiments divide the spectrogram into 2048 frequency bins (i.e., ranges) over a 22050 Hz frequency response. Similarly, one or more embodiments emphasize lower frequencies (i.e., includes additional bins at lower frequency ranges) to resolve bass notes. The digital media presentation system can map the spectrogram into a variety of ranges.

Figure 2:
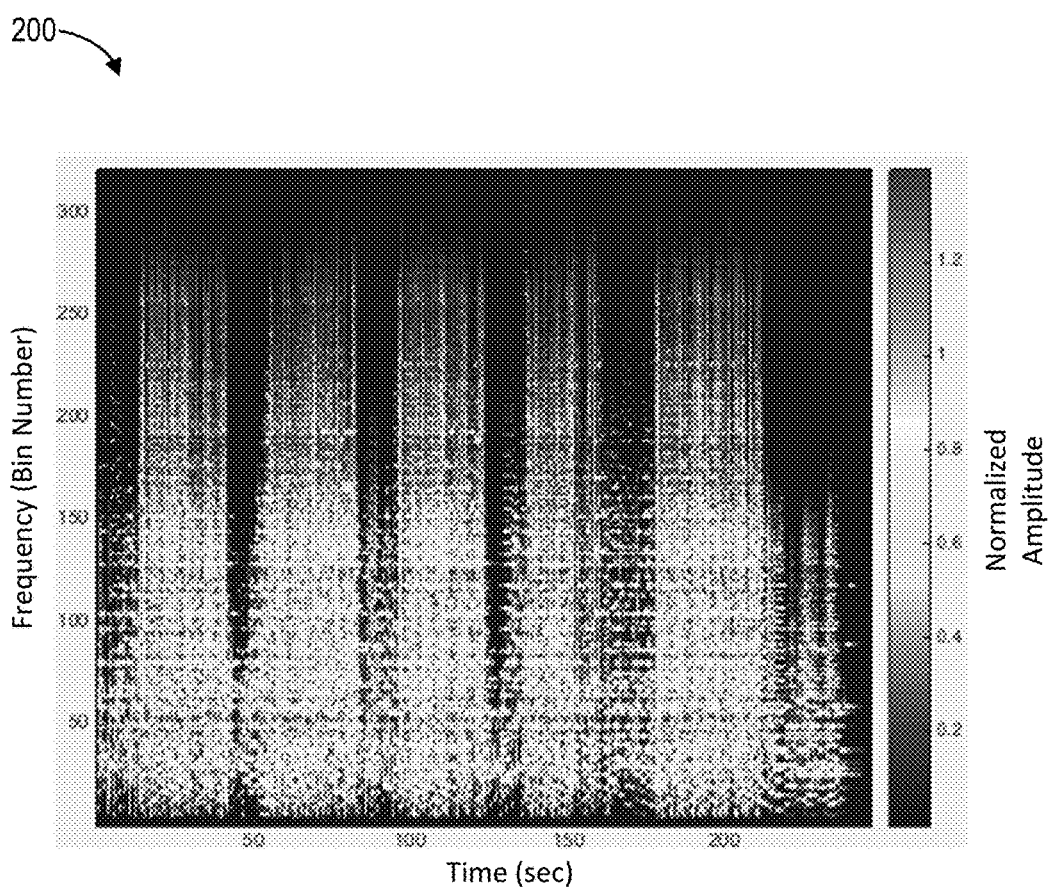
FIG. 2 illustrates a modified spectrogram in accordance with one or more embodiments.

One or more embodiments of the digital media presentation system further modify the weighted values from the spectrogram 100 to calculate one or more impact values. For instance, FIG. 2 illustrates a modified spectrogram 200 based on the spectrogram 100. In particular, the digital media presentation system has modified the spectrogram 100 by dividing the y-axis into ranges or bins. Specifically, the digital media presentation system has mapped the spectrogram 100 into 320 ranges along the y-axis, each range (or bin) representing a span of some frequency. It will be appreciated that although FIG. 2 illustrates a particular number of ranges, other embodiments of the digital media presentation system may utilize an alternative number of ranges and alternative units of measurement.

As illustrated by the modified spectrogram 200, the digital media presentation system has also changed the amplitude values of the spectrogram 100. In particular, the digital media presentation system has normalized the amplitude values. In one or more embodiments, the digital media presentation system normalizes the amplitude values based on a centroid. A centroid is the multivariate equivalent of a mean value that minimizes the sum of the squared distances to a point in a particular space. As discussed here, the centroid represents the point that minimizes the sum of the squares with regard to the measure of energy across all ranges of the spectrogram. In other words, the centroid represents the midpoint of a measure of energy associated with the digital audio content. The digital media presentation system can calculate the centroid according to a variety of methods or approaches. In one embodiment, however, the digital media presentation system calculates the centroid according to the following:

$$C = \frac{\sum_{i=1}^{n} E_i R_i}{\sum_{i=1}^{n} R_i}$$

where C represents the value of the centroid, E represents the measure of energy of any range, R represents the size of the range (e.g., the number of frequencies represented by the range), and n represents the total number of ranges across the entire spectrum. Thus, in one or more embodiments the digital media presentation system calculates a centroid over the entire set of spectrogram values (i.e., the centroid of amplitude, loudness, or other measure of energy utilized by a spectrogram).

Moreover, as just discussed, in one or more embodiments the digital media presentation system normalizes the spectrogram based on the centroid. For instance, one or more embodiments calculate the centroid and then normalize amplitude values such that the centroid is set to 0.5. For instance, one or more embodiments utilizes the following to normalize the spectrogram:

$$N = \frac{E}{2C}$$

where N is the normalized measure of energy, E is the original measure of energy, and C is the value of the centroid of the measure of energy over the entire set of spectrogram values. It will be appreciated that embodiments of the digital media presentation system can utilize other approaches to normalizing the spectrogram 100, including normalizing the spectrogram 100 utilizing alternative approaches or normalizing the spectrogram 100 so that the centroid is normalized to an alternative value.

Moreover, alternative embodiments of the digital media presentation system normalize values associated with the spectrogram 100 utilizing other values or measures. For instance, the digital media presentation system can normalize the spectrogram 100 by calculating a simple mean, median, or mode of the amplitude (or other measure of energy). Similarly, alternative embodiments can normalize the spectrogram 100 based on a pre-defined normalization value.

As shown in FIG. 2, in one or more embodiments, normalizing the amplitude ranges produces a spectrogram where most of the signal from the digital audio content falls between 0 and 1, with a small portion of values exceeding 1. The digital media presentation system utilizes normalized measures of energy to enhance particular ranges and/or highlight significant measures of energy. For instance, the digital media presentation system normalizes values associated with the spectrogram 100 and enhances specific frequency ranges by applying a curve. Specifically, one or more embodiments apply a curve to the spectrogram 200 of the following form:

$$N_\gamma = N^\gamma,$$

where $N_\gamma$ is a modified normalized measure of energy upon application of the gamma value, N is a normalized measure of energy, and γ represents a selected gamma value. For instance, in one or more embodiments, the digital media presentation system utilizes a gamma value of 1.5 with regard to the normalized measure of energy in the spectrogram 200 to enhance particular frequency ranges (e.g., enhance frequency ranges where the normalized measure of energy exceeds 1).

Figure 3:
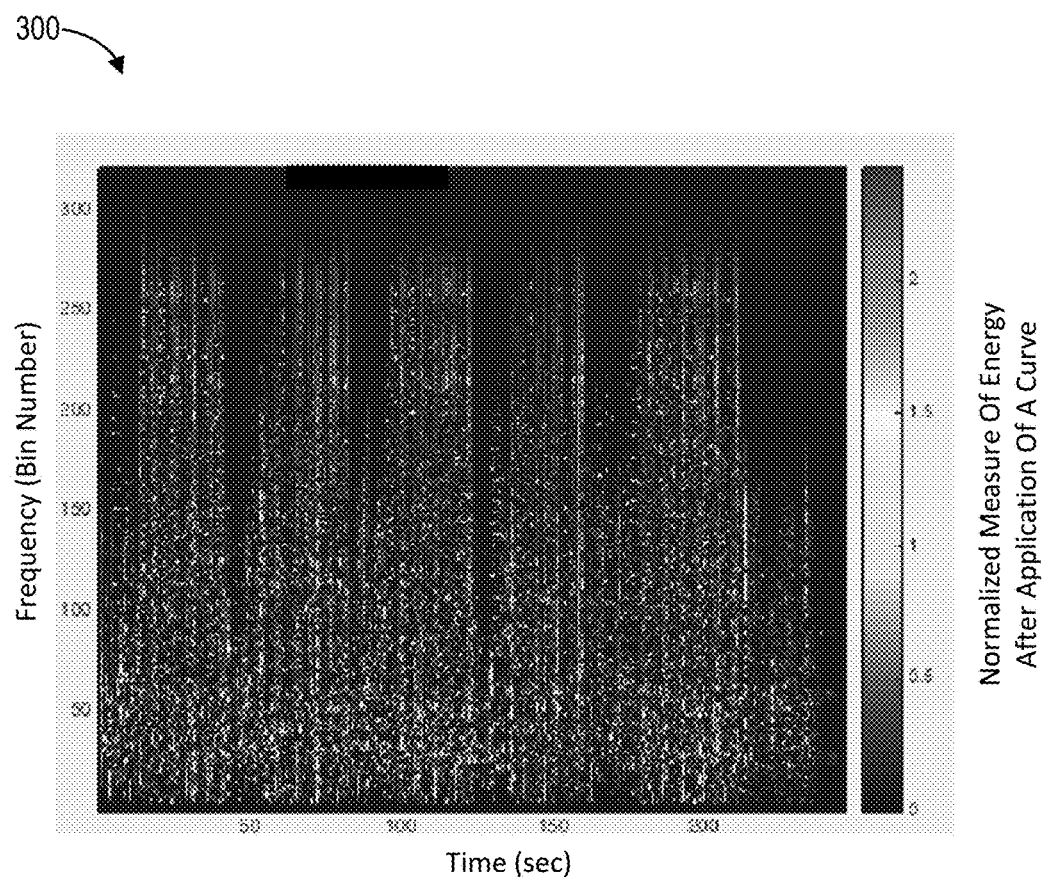
FIG. 3 illustrates a revised spectrogram in accordance with one or more embodiments.

In particular, FIG. 3 illustrates the modified spectrogram 200 upon application of a curve with a gamma value of 1.5. FIG. 3 illustrates a revised spectrogram 300 showing frequency ranges (or bins) along the y-axis, time along the x-axis, with a gray scale representing normalized measures of energy after application of a curve for each range at each time. As is visibly apparent from the modified spectrogram 200 (where a significant portion of the modified spectrogram 200 falls within the same portion of the gray scale) and the revised spectrogram 300 (where the measure of energy for various ranges varies more significantly across the gray scale), application of a curve can assist in enhancing differences between measures of energy at particular ranges and times.

The digital media presentation system can select a gamma value based on a variety of factors. For instance, the digital media presentation system selects a gamma value based on the distribution of a measure of energy associated with digital audio content (e.g., a large difference between a maximum and a minimum measure of energy may indicate a smaller gamma value), based on a type of digital audio content (e.g., genres tending to have small variation in energy may indicate a larger gamma value), based on user input, or some other factor.

It will be appreciated that alternative embodiments of the digital media presentation system may utilize alternative gamma values and/or alternative curve forms. Applying a curve to the normalized values, however, assists in more easily identifying transition points from calculated impact values.

As discussed previously, in one or more embodiments the digital media presentation system calculates one or more impact values (i.e., values representing a change in a measure of energy associated with digital audio content over time). In particular, in at least one embodiment, the digital media presentation system calculates impact values utilizing the normalized measures of energy (after application of a curve utilizing a gamma value) described with regard to FIG. 3.

Figure 4A:
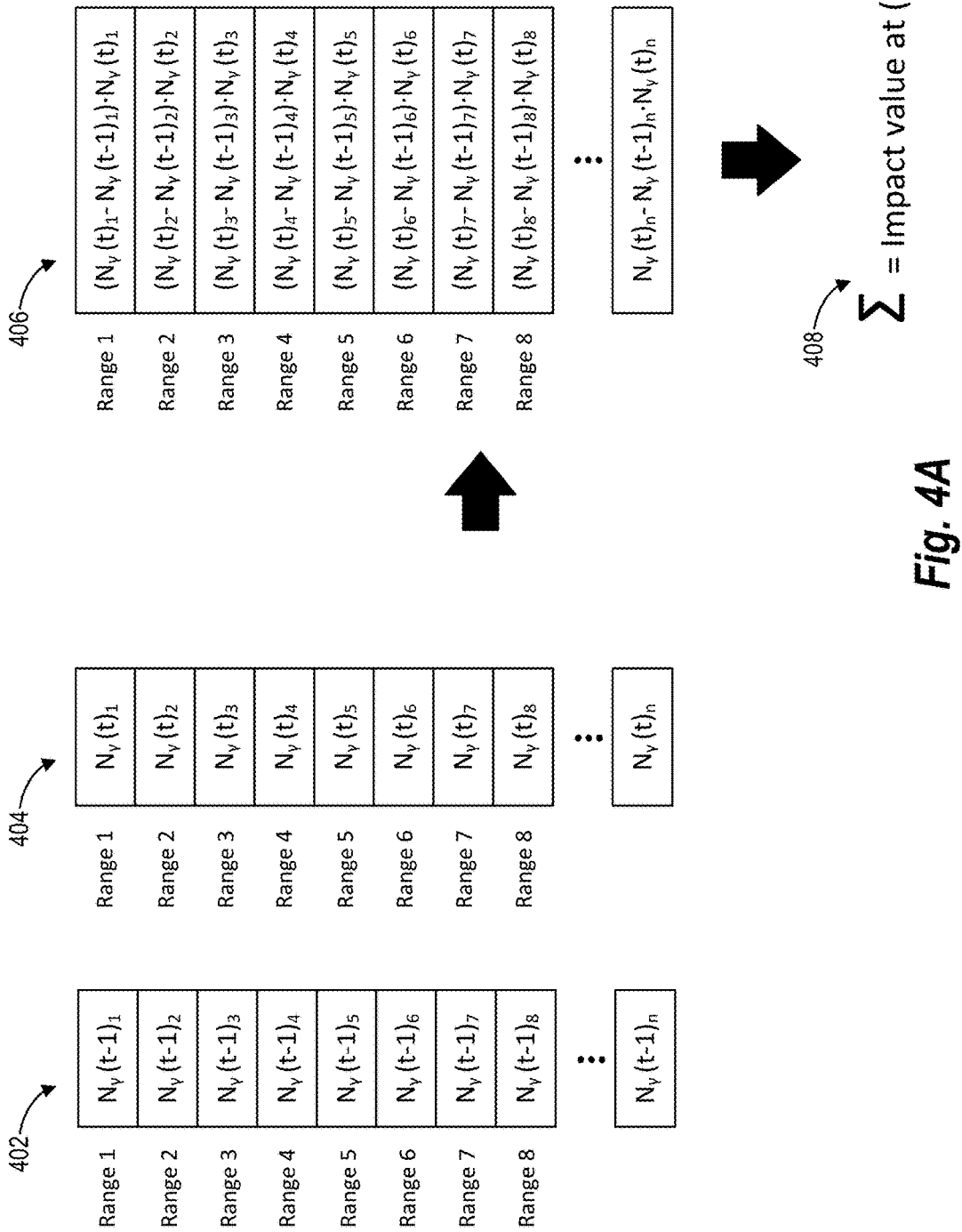
FIG. 4A illustrates a representation of generating impact values at a particular period in time in accordance with one or more embodiments.
Figure 4B:
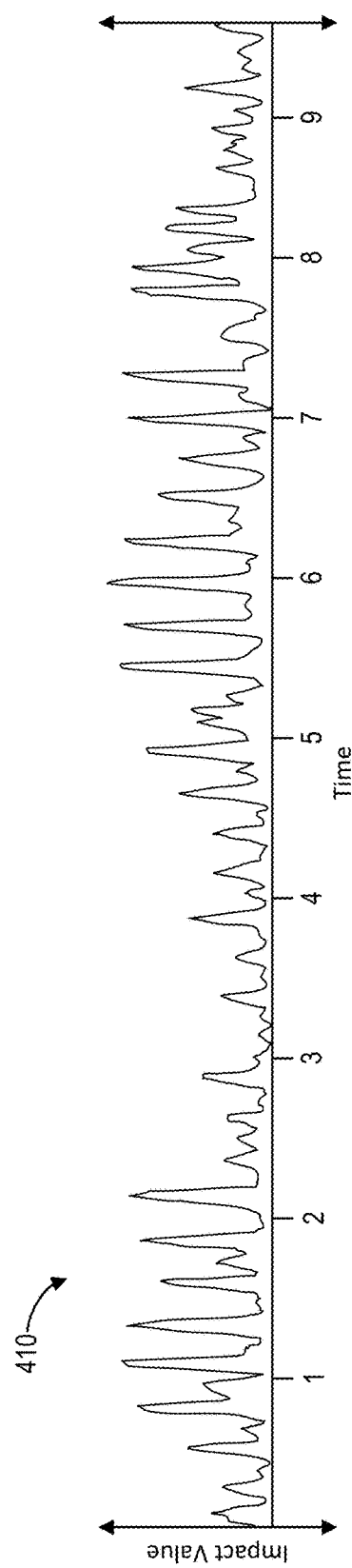
FIG. 4B illustrates a line graph of impact values over time in accordance with one or more embodiments.

In particular, FIGS. 4A-4B illustrate calculating impact values with regard to digital audio content according to one or more embodiments. FIG. 4A illustrates calculating impact values at a particular time, t, according to one or more embodiments. Specifically, FIG. 4A illustrates a representation of a spectrogram column at a first time 402 and a spectrogram column at a second time 404. In one or more embodiments, the columns 402 and 404 represent adjacent vertical columns in the revised spectrogram 300.

In particular, the spectrogram column at the first time 402 represents a measure of energy for each range at time, t−1. Similarly, the spectrogram column at the second time 404 includes a measure of energy for each range at a particular time, t. In one or more embodiments, the digital media presentation system calculates impact values by comparing the measure of energy at times t and t−1.

More specifically, column 402 includes a normalized measure of energy after application of a gamma value for each frequency range in spectrogram 300 at time, t−1. Similarly, column 402 includes a normalized measure of energy after application of a gamma value for each frequency range in spectrogram 300 at time, t. In one or more embodiments, the digital media presentation system calculates impact values for each frequency range (i.e., range-specific impact values) by calculating the change in a measure of energy over time in relation to the measure of energy at a particular period of time. With regard to the embodiment shown in FIG. 4A, the digital media presentation system takes the difference in a measure of energy between time, t, and time, t−1, and multiplies the difference by the measure of energy at time t. In other words, with regard to the embodiment of FIG. 4A, the digital media presentation system calculates range-specific impact values according to the following:

$$I(t)_i = (N_\gamma(t)_i - N_\gamma(t-1)_i) N_\gamma(t)_i,$$

where $I(t)_i$ is an impact value for range, i, at time, t; $N_\gamma(t)_i$ is a measure of energy (e.g., a normalized measure of energy after application of a gamma value) at time, t, and range, i; $N_\gamma(t-1)_i$ a is a measure of energy (e.g., a normalized measure of energy upon application of a gamma value) at time, t−1, and range, i; and n is the number of ranges in a spectrogram (e.g., 320 with regard to the specific embodiment of FIG. 3). The range-specific impact values are represented in FIG. 4A in a range-specific impact value column 406. These range-specific impact values provide a measure of impact for each range at each time period in the revised spectrogram 300.

Moreover, in one or more embodiments, the digital media presentation system calculates the impact value for period of time, t, by summing the range-specific impact values at time, t. Thus, as shown in FIG. 4A, the digital media presentation system may calculate an impact value 408 at time, t, by adding each value in the range-specific impact value column 406. In other words, calculating an impact value at time, t, in one or more embodiments, is represented according to the following:

$$I(t) = \sum_{i=1}^{n} I(t)_i \text{ or}$$

$$I(t) = \sum_{i=1}^{n} ((N_\gamma(t)_i - N_\gamma(t-1)_i)N_\gamma(t)_i)$$

where I(t) is an impact value at time, t; $N_\gamma(t)_i$ is a measure of energy (e.g., a normalized measure of energy upon application of a gamma value) at time, t, and range, i; and $N_\gamma(t-1)_i$ is a measure of energy (e.g., a normalized measure of energy upon application of a gamma value) at time, t−1, and range, i; and n is the number of frequency ranges in a spectrogram at time, t.

It will be appreciated that the digital media presentation system can calculate impact values utilizing any measure of energy over a particular period of time. Indeed, although FIG. 4A illustrates calculating impact values utilizing a normalized measure of energy (upon application of a gamma value), the digital media presentation system can calculate impact values based on normalized values without application of a gamma value, based on non-normalized values, or based on any measure of energy discussed herein.

Moreover, although FIG. 4A illustrates calculating impact values by multiplying a difference in a measure of energy between two points in time by the amount of energy at the second point in time, the digital media presentation system can calculate the impact value using a variety of alternative approaches. For example, rather than calculating a change in a measure of energy by looking backward in time (i.e., between time period, t, and time period, t−1), one or more embodiments calculate impact values by finding the difference between a measure of energy at a first time, t, and a second time period, t+1, and multiplying the difference by the measure of energy at the first time, t.

Moreover, one or more embodiments of the digital media presentation system calculates impact values by finding a difference between a measure of energy over more than two time periods. For instance, the digital media presentation system calculates a difference between in a measure of energy between three or more time periods to calculate impact values.

Similarly, the digital media presentation system may calculate impact values (i.e., a change in a measure of energy over time) utilizing a different mathematical construct. For instance, instead of multiplying a change in energy by a measure of energy, one or more embodiments of the digital media presentation system calculate impact values by dividing a change in energy by a measure of energy. Similarly, other embodiments calculate impact values as a ratio between a first measure of energy at a first period of time and a second measure of energy at a second period of time.

In addition, although FIG. 4A illustrates calculating range-specific impact values, it will be appreciated that alternative embodiments of the digital media presentation system do not require such specific calculations. For instance, in one or more embodiments the digital media presentation system calculates a total measure of energy for each period of time and utilizes the total measure of energy for each period of time to calculate an impact value for each period of time. In this manner, the digital media presentation system may not calculate a range-specific impact value in calculating a total impact value for a period of time.

Regardless of the specific calculation method, however, the digital media presentation system calculates impact values over time with regard to digital audio content. For example, FIG. 4B illustrates the impact values over time for the digital audio content previously reflected in the spectrogram 100, the modified spectrogram 200, and the revised spectrogram 300. In particular, FIG. 4B illustrates a line graph 410 showing the impact values of the digital audio content over time. Specifically, the line graph 410 illustrates impact values calculated by summing range-specific impact values for each time period represented in the revised spectrogram 300.

FIG. 4B represents an unfiltered measure of impact values; i.e., the digital media presentation system utilized unfiltered measures of energy to calculate the impact values. One or more embodiments of the digital media presentation system, however, apply one or more filters to calculate impact values with regard to particular aspects of digital audio content. For example, the digital media presentation system can apply filters to isolate percussive measures of energy, harmonic measures of energy, or lyrical measures of energy. By filtering for percussive energy, harmonic energy, or lyrical energy, the digital media presentation system calculates impact values specific to percussive impact, harmonic impact, or lyrical impact.

For instance, referring to FIG. 3, vertical patterns (e.g., vertical lines) running through the modified spectrograph 300 tend to indicate percussive energy (e.g., energy resulting from musical percussion, such as drums). Similarly, horizontal patterns across the spectrograph 300 tend to indicate harmonic energy (e.g., energy coming from harmonic notes, such as a guitar chord). Focusing on a particular type of energy allows the digital media presentation system to calculate a particular type of impact value, focused on a particular type of impact on a listener. For instance, transition points selected based on harmonic or lyrical impact tends to provide a more emotional "feel" to a digital media presentation. Similarly, transition points selected based on percussive impact tends to result in a more crisp, rhythmic digital media presentation.

The digital media presentation system can apply different filters based on the type of digital audio content, the type of digital visual content, features of the digital audio content, features of the digital visual content, user input, or other factors. For instance, in one or more embodiments, the digital media presentation system determines a genre associated with digital audio content (e.g., a love song), and based on that determination, apply a filter that isolates harmonic and lyrical energy in calculating impact values.

Moreover, in one or more embodiments, rather than applying a single filter to isolate a single type of energy, the digital media presentation system applies multiple filters and/or calculates multiple filtered impact values. For instance, the digital media presentation system calculates both percussive impact values based on a measure of percussive energy and harmonic impact values based on a measure of harmonic energy. The digital media presentation system then selects transition points based on both percussive impact values and harmonic impact values. Similarly, the digital media presentation system can utilize percussive impact values with regard to certain portions of digital audio content or digital media content and utilize harmonic impact values with regard to other portions of digital audio content or digital media content.

Although FIGS. 1-4B and the corresponding descriptions have utilized spectrograms to describe operation of the digital media presentation system, it will be appreciated that the digital media presentation system can convert and analyze digital audio content utilizing a variety of alternative means. For instance, the digital media presentation system can utilize tables, arrays, matrices, and a variety of other digital elements to perform the functions described above. It will be appreciated that the illustrations and discussions with regard to spectrograms are exemplary, and not limiting, with regard to operation of the digital media presentation system.

Figure 5:
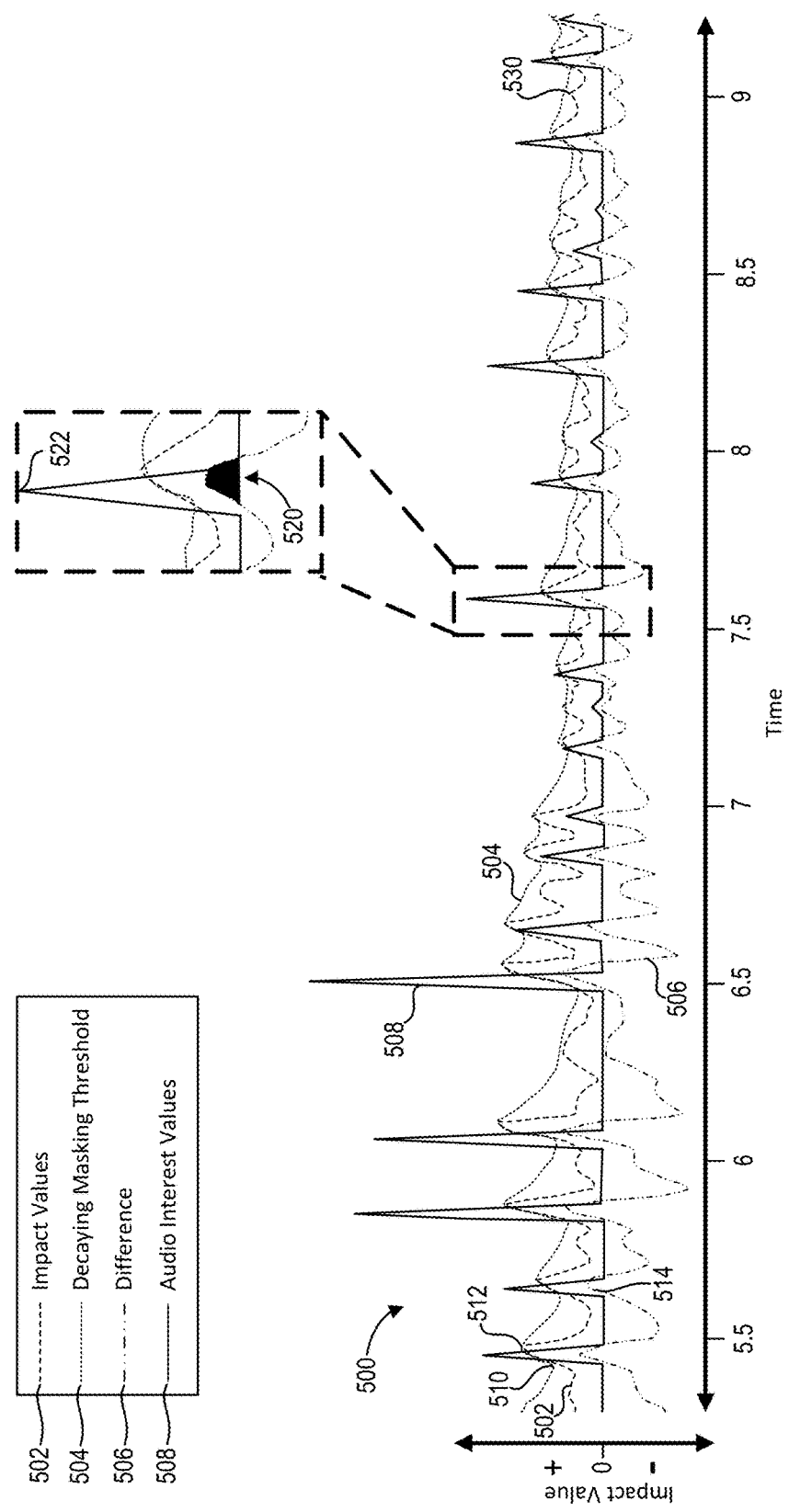
FIG. 5 illustrates line graphs representing modification of impact values in accordance with one or more embodiments.

As discussed above, impact values provide a useful means for identifying how a listener will experience or perceive digital audio content. That said, one or more embodiments utilize one or more decaying masking filters to identify transition points that more accurately reflect human visual and audio capabilities and preferences. In particular, FIG. 5 illustrates application of a decaying masking threshold in accordance with one or more embodiments of the digital media presentation system. Specifically, FIG. 5 illustrates how the digital media presentation system applies a decaying masking threshold to filter out audio events and create audio interest values (i.e., potential transition points that account for human audio capabilities and preferences).

Specifically, FIG. 5 illustrates a graph 500 containing impact values 502 (corresponding to impact values displayed in FIG. 4B) together with a decaying masking threshold 504, a difference line 506, and, ultimately, audio interest values 508. In one or more embodiments the digital media presentation system generates the decaying masking threshold 504; compares the decaying masking threshold 504 with the impact values 502 to generate the difference line 506; and utilizes positive portions of the difference line 506 to calculate audio interest values. Audio interest values 508 identify potential transition points for syncing digital visual content with digital audio content.

As mentioned above, a decaying masking threshold assists in identifying transition points from impact values. Specifically, in one or more embodiments the decaying masking threshold 504 is a value or function that decays (e.g., descends) over time until intersecting another value or function. For example, with regard to FIG. 5, the decaying masking threshold 504 decays until intersecting impact values 502 at point 510. Upon intersecting the impact values 502 at point 510, the decaying masking threshold 504 increases until point 512. After point 512, the decaying masking threshold 504 decays again until intersecting the impact values 502. By increasing and decaying over time, the decaying masking threshold filters out repetitive and/or clustered audio events.

The decaying masking threshold can decay according to a variety of models. For instance, in one or more embodiments, the decaying masking threshold begins at an initial threshold and descends according to an exponential decay model. In other embodiments, the decaying masking threshold descends according to a linear, logarithmic, or other type of decay model. Generally, regardless of the specific model, the decaying masking threshold decays according to an associated rate of decay. Moreover, in one or more embodiments, the decaying masking threshold also has a minimum threshold value (e.g., a minimum value below which the threshold will not fall).

Although the decaying masking threshold 504 descends until intersecting another value or function, the term "intersect" or "intersecting" as used herein refers to a value or function coming within a proximity of another value or function. For example, as illustrated in FIG. 5, the decaying masking threshold 504 descends until intersecting the impact values 502 at point 510. Thus, intersect with regard to the embodiment of FIG. 5 means that the decaying masking threshold comes within a distance of zero of the impact values 502. In other embodiments, the decaying masking threshold 504 descends until coming within another distance (e.g., 0.1) of the impact values 502.

As mentioned, upon intersecting another value or function, in one or more embodiments the decaying masking threshold increases. The decaying masking threshold can increase according to a number of models or patterns. For instance, the decaying masking threshold can increase linearly, exponentially, logarithmically, or parabolically. Accordingly, the decaying masking threshold can increase at a particular rate or by a particular amount. Alternatively or additionally, the decaying masking threshold can increase in proportion to the impact values 502. For example, the decaying masking threshold 504 may increase by a multiple of the increase in the impact values 502 (e.g., increase by an amount that is double the increase in the impact values 502 from the point of intersection). Additionally, the decaying masking threshold 504 may increase by a pre-defined amount above a local maximum in the impact values 502.

With regard to the embodiment of FIG. 5, upon intersecting the impact values 502, the decaying masking threshold 504 increases by the same amount as the impact values 502. The decaying masking threshold 504 continues to increase by the same amount as the impact values 502 until the impact values 502 descend at a rate greater than the decay rate associated with the decaying masking threshold 504. Specifically, the decaying masking threshold 504 continues to increase by the same amount as the impact values 502 until point 512.

Although FIG. 5 illustrates the decaying masking threshold decaying after point 512, in one or more embodiments, the decaying masking threshold 504 may continue to temporarily increase after the impact values 502 decrease. For example, the decaying masking threshold 504 may continue to expand by a pre-determined amount. Additionally, or alternatively, the decaying masking threshold 504 may continue to expand based on an amount that the impact values 502 increased. Similarly, the decaying masking threshold 504 may continue to expand based on a rate that the impact values 502 increased (or based on some other factor). The decaying masking threshold 504 can continue to increase linearly, exponentially, or by a certain amount.

In embodiments where the decaying masking threshold 504 continues to increase after the impact values 502 descend at a rate faster than the decay rate, ultimately, the decaying masking threshold 504 will begin to decay once again. The digital media presentation system can re-initiate decay based on passage of a certain amount of time, when a pre-defined amount of increase has occurred.

Returning now to FIG. 5, in response to the impact values 502 decreasing at a rate faster than the decay rate associated with the decaying masking threshold 504, the decaying masking threshold 504 once again begins to decay. Thus, after point 512, the decaying masking threshold 504 begins to decay again at the decay rate. The decaying masking threshold 504 continues to decay until intersecting the impact values 502 again at point 514. At point 514, the decaying masking threshold begins to increase (as described above).

Accordingly, as shown in FIG. 5, the decaying masking threshold 504 rises and falls over time as it traverses and intersects the impact values 502. One or more embodiments of the digital media presentation system identify transition points based on the intersection of the decaying masking threshold 504 and the impact values 502. In particular, one or more embodiments of the digital media presentation system compare the decaying masking threshold 504 and the impact values 502 to determine when the impact values 502 satisfy the decaying masking threshold 504 (e.g., when the decaying masking threshold 504 intersects and/or overlaps the impact values 502). The digital media presentation system utilizes areas where the impact values 502 satisfy the decaying masking threshold 504 to identify transition points.

In particular, in one or more embodiments, the digital media presentation system selects transition points by calculating one or more audio interest values based on one or more intersections. In particular, the digital media presentation system compares the impact values 502 with the decaying masking threshold 504 to calculate audio interest values. For example, as illustrated in FIG. 5, one or more embodiments calculate a difference line 506. The difference line 506 shows the difference between the decaying masking threshold 504 and the impact values 502. Thus, where the decaying masking threshold 504 and the impact values 502 do not intersect, the difference line 506 is negative.

With regard to areas where the decaying masking threshold 504 and the impact values 502 intersect (i.e., points where the impact values satisfy the decaying masking threshold 504), in one or more embodiments, the difference line 506 illustrates the extent to which the impact values increase the decaying masking threshold 504. In other words, the difference line 506 indicates the extent to which the impact values 502 alter the decaying masking threshold 504. Thus, where the impact values 502 intersect the masking threshold 504 and "push" it to increase, the difference line 506 increases, where the impact values 502 begin to level off (and the amount of "push" decreases) the difference line 506 decreases.

The particular values of the difference line 506 may vary from embodiment to embodiment. For example, in some embodiments, the difference line 506 may reflect the magnitude of any increase in the masking threshold 504. In other embodiments, the difference line 506 reflects only the intersected portions of the impact values 502 and the masking threshold 504. Ultimately, the difference line 506 represents a comparison between the decaying masking threshold and the impact values 502.

One or more embodiments of the digital media presentation system calculate the audio interest values 508 based on the positive portions of the difference line 506 (e.g., the impact values 502 that satisfy the decaying masking threshold 504). For instance, with regard to the embodiment illustrated in FIG. 5, the digital media presentation system utilizes the magnitude of portion 520 to calculate the magnitude of audio interest value 522. Specifically (and as discussed in greater detail below), the digital media presentation system calculates the audio interest values 508 by calculating a centroid of the positive values of the difference line 506, normalizing the positive values of the difference line 506, modifying the normalized values by applying a curve (e.g., a gamma value) to the normalize values, and accumulating the modified, normalized values to a single time period.

Thus, as mentioned, one or more embodiments calculate a centroid of the positive portions of the difference line 506. In particular (and as discussed previously with regard to centroids), the digital media presentation system calculates the point that minimizes the sum of the squares with regard to the positive portions of the difference line 506 across time. In other words, the centroid provides a measure of the mid-point value with regard to the magnitude of the positive portions of the difference line 506.

Moreover, as discussed, one or more embodiments of the digital media presentation system normalize the positive portions of the difference line 506 to generate the audio interest values 508. Specifically, the digital media presentation system can normalize the positive portions of the difference line 506 based on the centroid. For example, in one or more embodiments the digital media presentation system normalizes the positive portions of the difference line 506 such that the centroid value is equal to 0.5 (or some other value). As discussed previously, alternative embodiments may utilize another measure to normalize the positive portions of the difference line 506, such as a pre-determined value or a mean, median, or mode value. By normalizing the positive portions of the difference line 506, the digital media presentation system can emphasize, and more easily identify, spikes in audio interest values.

Moreover, as discussed previously, the digital media presentation system can also apply a gamma value. For example, the digital media presentation applies a curve with a gamma value to the normalized values. In this manner, the digital media presentation system can further emphasize distinctions in the normalized values.

Furthermore, one or more embodiments of the digital media presentation system accumulate the normalized values. Specifically, the digital media presentation system accumulates normalized values spread over a duration of time to more clearly define audio interest values and/or transition points. Indeed, as illustrated, the positive portions of the difference line 506 may accumulate over a number of different time periods. Accumulating successive normalized values into a single time period helps to ensure that impact events that occur over a larger time scale will still trigger a transition where appropriate.

Thus, FIG. 5 illustrates the audio interest values 508. The audio interest values 508 reflect the positive portions of the difference line 506 upon calculation of a centroid, normalization based upon the centroid, application of a gamma value, and accumulation of the normalized values into a single time period. As shown in FIG. 5, the digital media presentation system utilizes this approach to produce a series of spikes in the audio interest values 508 that clearly delineate potential transition points.

Moreover, FIG. 5 also illustrates that by applying the decaying masking threshold 504, the digital media presentation system has filtered some relative maximum values from the impact values 502. For example, point 530 in the impact values 502 is a relative maximum (or "spike") in the impact values without a corresponding spike in the audio interest values 508. The decaying masking threshold has filtered the point 530 so that it is not represented in the audio interest values 508 (e.g., is not identified as a potential transition point).

As discussed above, this filtering effect helps to limit duplicative, expected transition points. Moreover, this filtering effect approximates the relative reduction in impact that a listener experiences after an impact event in audio digital content. For example, the point 530 in the impact values 502 comes shortly after a large spike in the impact values 502. The decaying masking threshold 504 has removed the relative maximum point 530 from the audio interest values 508; thus, avoiding a repetitive, expected transition while also approximating the decreased relative impact experienced by a user with regard to point 530 due to the significant impact event preceding the point 530.

Figure 6:
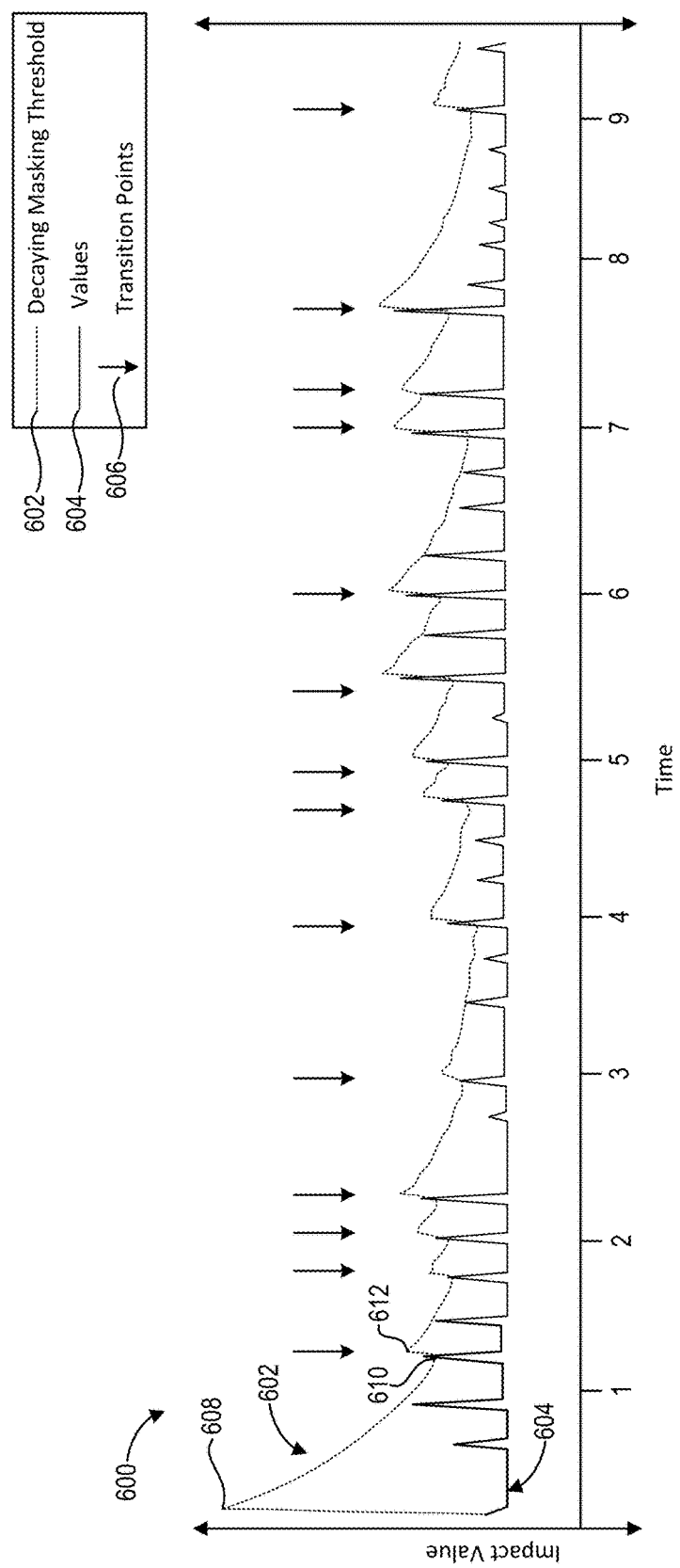
FIG. 6 illustrates application of a decaying masking threshold in accordance with one or more embodiments.

As mentioned previously, the digital media presentation system can apply multiple decaying masking thresholds to identify transition points. In particular, in addition to the decaying masking threshold just discussed, the digital media presentation system can apply a decaying masking threshold to account for visual limitations or preferences. For instance, FIG. 6 illustrates a graph 600 showing application of a decaying masking threshold 602 to values 604. In one or more embodiments, the values 604 are equivalent to (or derived from) the audio interest values 508 discussed with regard to FIG. 5.

In one or more embodiments, application of the decaying masking threshold 602 reduces the possibility of selecting transition points that display visual digital content too rapidly. For example, the digital media presentation system applies the decaying masking threshold 602 to avoid selecting transition points that display digital visual content faster than a user can comprehend or appreciate the digital visual content. Moreover, the digital media presentation system applies the decaying masking threshold 602 to that reduce the possibility of users losing interest in digital visual content. Indeed, like the decaying masking threshold 504 (which approximates a user's perception of impact after significant audio events), the decaying masking threshold 602 approximates a users decaying interest in digital visual content after a transition in digital visual content. Immediately after a change in digital visual content a user can have decreased interest that increases over time. The digital media presentation system approximates a user's visual interests by utilizing the decaying masking threshold.

In particular, FIG. 6 illustrates the decaying masking threshold 602 with an initial threshold value 608. The decaying masking threshold 602 decays from the initial threshold value 608 until intersecting the values 604 at point 610. Upon intersecting the values 604 at point 610, the decaying masking threshold 602 expands to increased point 612. Thereafter, the decaying masking threshold 602 begins to decrease. Upon intersecting the values 604, the decaying masking threshold 602 once again increases. Accordingly, as illustrated, the decaying masking threshold 602 intersects some spikes in the values 604, but fails to intersect other spikes. In this manner, the decaying masking threshold 602 identifies a subset of transition points corresponding to significant audio events and filters other significant audio events in accordance with certain visual capabilities and preferences.

As discussed above, the decaying masking threshold 602 decays or increases according to a model, including, but not limited to, exponential, linear, or logarithmic. For instance, the decaying masking threshold 602 decays exponentially. Moreover, upon intersecting the values 604, the decaying masking threshold increases with the values 604.

Moreover, as illustrated, in one or more embodiments the decaying masking threshold 602 expands beyond the values 604. As discussed with regard to the decaying masking threshold 504, the decaying masking threshold 602 expands according to a pattern or model. For example, in some embodiments the decaying masking threshold 602 expands beyond the values 604 by a pre-determined amount. In other embodiments, the decaying masking threshold 602 expands for a certain duration of time.

The amount (or time) that the decaying masking threshold 602 increases can vary based on a variety of factors. For example, in one or more embodiments the decaying masking threshold 602 expands based on the height of the values 604. In particular, the decaying masking threshold 602 expands based on the height of the values 604 relative to the height of the decaying masking threshold 602 (e.g., the height of a peak of the values 604 compared to the height of the decaying masking threshold 602 at a point of intersection). Thus, for example, where the decaying masking threshold intersects a particularly high spike in the values 604, the decaying masking threshold 602 may increase by a greater amount. Moreover, in other embodiments the digital media presentation system determines the magnitude that the decaying masking threshold 602 increases based on the time since the last intersection, the time until the next intersection, or some other factor.

As discussed previously, in one or more embodiments, the digital media presentation system identifies transition points based on intersections with the decaying masking threshold 602. In particular, as shown in FIG. 6, the digital media presentation system identifies transition points 606 based on intersections between the decaying masking threshold 602 and the values 604.

In one or more embodiments, the digital media presentation system identifies the transition points 606 by comparing the decaying masking threshold 602 and the values 604. In particular, the digital media presentation system calculates a difference between the decaying masking threshold 602 and the values 604 to identify time periods where the values 604 intersect the decaying masking threshold (e.g., satisfy the decaying masking threshold 602). The digital media presentation system identifies transition points based on the intersections.

For example, in one or more embodiments, the digital media presentation system places the transition points 606 at the time of a peak in the value 604 after the decaying masking threshold intersects the values 604. In other embodiments, the digital media presentation system places the transition points at the time that the decaying masking threshold 602 intersects the values 604. Other embodiments of the digital media presentation system place the transition points 606 based on a time period associated with an intersection between the decaying masking threshold 602 and the values 604.

One or more embodiments of the digital media presentation system apply an additional filter beyond the decaying masking threshold in identifying transition points. In particular, one or more embodiments compare identified transition points and filter out less impactful transition points that fall just prior to an impactful transition point. In this manner, the digital media presentation system prevents or reduces distracting transitions. Specifically, one or more embodiments compare the magnitude of values 604 (or impact values or some other values) associated with two transition points as well as the time between the two transition points. Where the two transition points fall within a pre-defined time threshold and where the difference in magnitude exceeds a magnitude threshold, in one or more embodiments the digital media presentation system filters one of the transition points (e.g., a transition point of smaller magnitude that comes first in time).

In addition to identifying transition points, one or more embodiments of the digital media presentation system also identify different types of transition points. For example, one or more embodiments of the digital presentation system identify transition points corresponding to transitions from one digital visual content item to another digital visual content item (i.e., asset transition points). Similarly, one or more embodiments of the digital media presentation system identify transition points corresponding to effects or other modifications applied to digital visual content items (i.e., micro-transition points).

For example, micro-transitions may include utilizing the same digital visual content item, but displaying a specific portion of the digital visual content item (e.g., zooming to a portion of an image, or skipping to a portion of a video). Similarly, a micro-transition point may include a visual modification to a digital visual content item (e.g., changing the color, size, or location).

In one or more embodiments, the digital media presentation correlates different transition points to different audio events. For instance, the digital media presentation utilizes micro-transition points in conjunction with sequential audio events (e.g., in conjunction with a drum roll, the digital media presentation system rapidly cuts to different portions of a video). Alternatively, the digital media presentation utilizes asset transition points with regard to audio events separate by additional time.

The digital media presentation system identifies types of transition points based on a variety of factors. For example, the digital media presentation system can identify a type of transition point based on the time between transition points, based on the magnitude of the values 604 corresponding to a transition point, based on impact values corresponding to a transition point, or another factor. Moreover, as discussed in greater detail below, one or more embodiments of the digital media presentation system modify parameters based on different types of transition points.

As mentioned previously, the digital media presentation system can apply different decaying masking thresholds to filter different capabilities or preferences (e.g., visual or audio capabilities or preferences). Accordingly, one or more embodiments of the digital media presentation system apply the decaying masking threshold 602 with different parameters than the decaying masking threshold 504. Indeed, in embodiments that utilize the decaying asking threshold 602 to approximate visual capabilities and interests, the digital media presentation system applies different parameters than a decaying masking threshold utilized to approximate auditory capabilities and interests. Thus, for example, the initial threshold value 608 may be different than an initial threshold value associated with the decaying masking threshold 504. Similarly, other parameters may differ between decaying masking thresholds, including, but not limited to, decay rate, minimum threshold value, expansion rate (i.e., in embodiments where the threshold expands at a certain rate), expansion amount (i.e., in embodiments where the threshold expands by a certain amount), expansion time (i.e., in embodiments where the threshold expands for a certain time period), intersection values (i.e., in embodiments that define intersection at some value other than a distance of zero), or other parameters.

In addition to adjusting parameters to different decaying masking thresholds, the digital media presentation system can also adjust parameters based on a variety of other factors. For instance, the digital media presentation system can adjust parameters applicable to a decaying masking threshold based on one or more features of digital visual content. For instance, the digital media presentation system modifies parameters applicable to a decaying masking threshold based on a type of digital visual content. Specifically, the digital media presentation system can apply different parameters to images, videos, GIFs, or other types or formats of digital visual content. For example, the digital media presentation system can apply a different decay rate (or modify some other parameter) with regard to images than the decay rate applies to videos.

Similarly, the digital media presentation system can modify parameters applicable to a decaying masking threshold based on the contents of digital visual content. For instance, one or more embodiments of the digital media presentation system can utilize facial recognition technology to detect one or more individuals pictured in digital visual content. The digital media presentation system can modify parameters based on the individuals pictured in digital visual content. For instance, the digital media presentation system can determine that a user may experience increased interest in a digital visual item where the user (or a user's friend, a user's family, or a user's co-worker) appears in the digital visual item. Accordingly, in one or more embodiments the digital media presentation system can increase the amount of expansion associated with the decaying masking threshold (or modify some other parameter) to approximate the increased interest associated with the digital visual item.

Similarly, one or more embodiments of the digital media presentation system can utilize object recognition technology to identify objects pictured in digital visual content. The digital media presentation system can modify parameters based on the objects identified in the digital visual content. For example, the digital media presentation system detects a location, monument, or other object in a photo and, in response, modifies the decay rate associated with the decaying masking threshold (or some other parameter).

In addition, the digital media presentation system can modify parameters based on a comparison between multiple digital visual content items. For instance, the digital media presentation system, in one or more embodiments, modifies parameters by comparing adjacent digital visual content items in a sequence of digital visual content items (e.g., items to be displayed sequentially in a digital media presentation). For example, the digital presentation system recognizes that an image is followed by a video in a digital media presentation and modifies the parameters of the decaying masking threshold based on the difference between the two types of digital visual content items.

For instance, the digital media presentation system compares a plurality of digital visual content items (e.g., a plurality of digital visual content items to be displayed sequentially in a digital media presentation) and determines that the plurality of digital visual content portray a single individual. In such circumstances, it is likely that viewers will need less time to comprehend changes amongst the plurality of digital visual content items. Moreover, viewers are more likely to lose interest over time with regard to digital visual content items portraying the same individual. Accordingly, the digital media presentation system can decrease the magnitude of expansion of the decaying masking threshold (or modify some other parameter). In this manner, the digital media presentation system can approximate viewer preferences and capabilities with regard to the detected features of the plurality of digital visual content items (e.g., asset transitions) by modifying parameters affiliated with the decaying masking threshold.

In other embodiments, the digital media presentation system determines that a plurality of digital visual content items do not contain related content and may require additional time for a viewer to comprehend. In such circumstances the digital media presentation system modifies parameters (e.g., decrease a decay rate, increase an expansion amount or rate) to pull out more suitable transition points.

Relatedly, one or more embodiments modify parameters with regard to a decaying masking threshold based on a type of transition point. For instance, the digital media presentation system can modify parameters (e.g., increase a decay rate, decrease an increase magnitude) with regard to micro-transitions. Similarly, the digital media presentation system can modify parameters (e.g., decrease a decay rate) with regard to asset transitions. In other words, the digital media presentation system can modify parameters in an effort to pull out particular types of transition points.

In addition, the digital media presentation system can also modify parameters based on a type of transition effect associated with digital visual content. For instance, the digital media presentation system can change from displaying one digital visual content item to displaying another digital visual content item utilizing a transition effect (e.g., a visual fading effect from one digital visual content item to another). Similarly, the digital media presentation can apply a variety of different micro-transition effects (e.g., change the color of the digital visual content item; zoom to a portion of the digital visual content item; skip to a slightly different portion of a video, etc.). The digital media presentation system can adjust parameters based on a particular type of transition effect.

The digital media presentation system can modify parameters based on a variety of other features with regard to digital visual content. For example, the digital media presentation system can modify parameters based on the size and/or quality of digital visual content; based on the length of digital visual content (e.g., length of a video); based on visual characteristics of digital visual content (e.g., brightness, clarity, colors, hue, or other visual characteristics); or other factors.

In one or more embodiments, the digital media presentation system also modifies parameters based on user input. For instance, a user can indicate (and modify) a certain pace or tempo associated with the digital media presentation system. The digital media presentation system can adjust parameters associated with the decaying masking threshold based on the indicated pace or tempo requested by a user.

Aside from modifying parameters discussed associated with a decaying masking threshold, the digital media presentation system can also modify other parameters. For instance, the digital media presentation system can also modify gamma values, filters, or other parameters discussed herein based on features of digital visual content, user input, or other factors.

It will be appreciated that although the values 604 shown in FIG. 6 correspond to the audio interest values 508 calculated with regard to FIG. 5, the digital media presentation system can apply the decaying masking threshold 602 to other values. For example, the digital media presentation system can apply the decaying masking threshold 602 to impact values or other values.

Similarly, although illustrated in FIGS. 5 and 6 as applying a certain number of decaying masking thresholds, other embodiments of the digital media presentation system apply only a single decaying masking threshold (while other embodiments apply a different number of decaying masking thresholds). For instance, one or more embodiments applies the decaying masking threshold 602 to the impact values 502, and identifies transition points based on the intersection of the decaying masking threshold 602 and the impact values 502 (i.e., without applying the decaying masking threshold 504). Other embodiments apply another decaying masking threshold. For instance, one or more embodiments apply one decaying masking threshold with regard to percussive impact values (e.g., impact values based on a percussive measure of energy) and another decaying masking threshold based on harmonic impact values (e.g., impact values based on a harmonic measure of energy). Similarly, one or more embodiments apply different decaying masking thresholds with regard to a first portion of digital audio content to be played in conjunction with a first type of digital visual content, and apply a second digital masking threshold with regard to a second portion of digital audio content to be played in conjunction with a second type of digital visual content.

Figure 7:
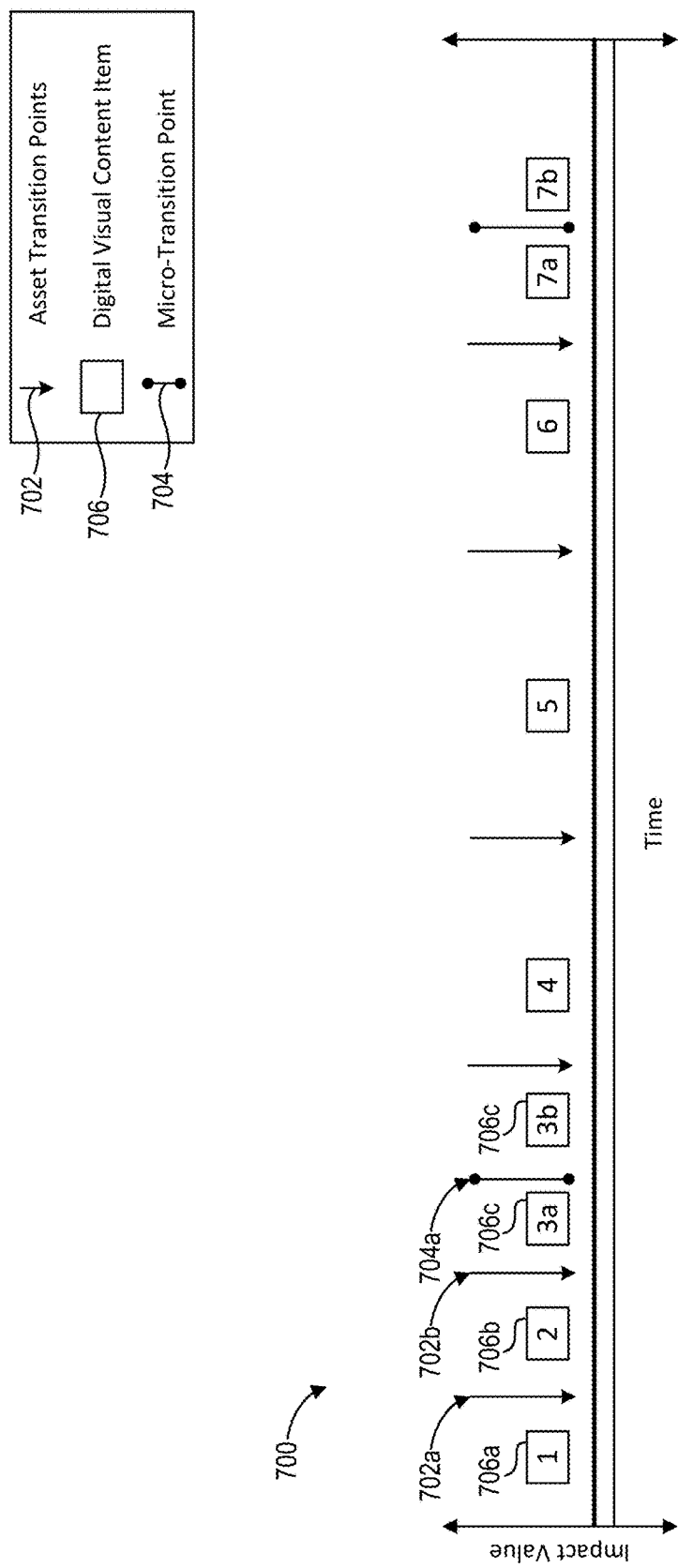
FIG. 7 illustrates a representation of syncing digital visual content with digital audio content in accordance with one or more embodiments.

Turning now to FIG. 7, additional detail will be provided regarding displaying digital visual content in conjunction with digital audio content in accordance with one or more embodiments. In particular, one or more embodiments of the digital media presentation system display digital visual content in conjunction with digital audio content based on identified transition points. For instance, FIG. 7 illustrates a representation 700 of transition points—specifically, asset transition points 702 and micro-transition points 704—together with digital visual content items 706 to be displayed over time (i.e., synced) with digital audio content. In one or more embodiments the asset transition points 702 and the micro-transition points 704 correspond to the transition points 606 with regard to FIG. 6

As discussed, the digital media presentation system identifies transition points, including asset transition points (i.e., transition points that change from one digital visual content item to another digital visual content item) and micro-transition points (i.e., transition points that modify a digital visual content item). Thus, with regard to FIG. 7, the digital media presentation system has identified asset transition point 702*a*. Accordingly, the digital media presentation system displays digital visual content item 706*a* until the transition point 702*a*. At the transition point 702*a*, the digital media presentation displays new digital visual content item 706*b*. Similarly, after the next asset transition point 702*b*, the digital media presentation system displays a third digital visual content item 706*c*.

One or more embodiments of the digital media presentation system also display a transition effect at one or more asset transition points. For instance, at asset transition point 702*a*, the digital media presentation system displays a wiping effect that removes the digital visual content item 706*a* and reveals the digital visual content item 706*b*. The digital media presentation system can apply a variety of transition effects.

The digital media presentation system selects transition effects based on a variety of factors. In one or more embodiments, the digital media presentation system selects transition effects based on pop values. As used herein, the term "pop values" revers to values assigned to a transition effect indicating a type of transition effect. For instance, a pop value includes a value assigned to a transition effect based on the length of the transition effect. For example, in one or more embodiments the digital media presentation system assigns transition effects that quickly change from one digital content item to another a high pop value (e.g., a pop value of 1). Similarly, in one or more embodiments the digital media presentation assigns transition effects that slowly change from one digital content item to another a low pop value (e.g., a pop value of 0). Other embodiments of the digital media presentation system also apply pop values to particular transition effects based on visual intensity or other factors.

The digital media presentation can compare the pop value to a variety of factors associated with the digital visual content and digital audio content to select a transition effect for a particular transition point. For example, the digital media presentation can compare the pop value to an impact value associated with a transition point, a time associated with a transition point (e.g., a time that impact values are elevated with regard to a transition point), a magnitude of audio impact values, a time associated with audio impact values (e.g., a time that the difference line 506 is positive), a time between transition points, or some other factor. Based on the comparison, the digital media presentation system can select a transition effect.

Specifically, with regard to the embodiment of FIG. 7, the digital media presentation system determines that asset transition point 702a corresponds to an impact event of short duration (e.g., impact values associated with the transition point are elevated for a short period of time). Based on the determination, the digital media presentation system selects a transition effect with a high pop value (e.g., a transition effect of short duration).

As illustrated in FIG. 7, the digital media presentation system can also display digital visual content with regard to one or more micro-transition points. For instance, the digital media presentation system can display digital visual content item 706c until micro-transition point 704a. After micro-transition point 704a, the digital media presentation system can modify display of the digital visual content item 706c. For instance, the digital media presentation system can modify the color of the digital visual content item 706c, zoom to a portion of the digital visual content item 706c, change the location of the digital visual content item 706c with regard to a display device showing the digital visual content item 706c, or otherwise modify the digital visual content item 706c. As illustrated, micro-transitions tend to require less time for a user to comprehend; thus, micro-transitions may be spaced closer together in time.

As illustrated in FIG. 7, the digital media presentation system displays digital visual content in conjunction with digital audio content over a period of time. In particular, the digital media presentation system syncs digital audio content and digital video content utilizing transition points. Specifically, the digital media presentation system generates a digital media presentation with the digital visual content synced to digital audio content, with changes in digital visual content synced to identified transition points in the digital audio content. In this manner, the digital media presentation system generates digital media presentations that are more entertaining, innovative, emotional, and soulful.

Figure 8:
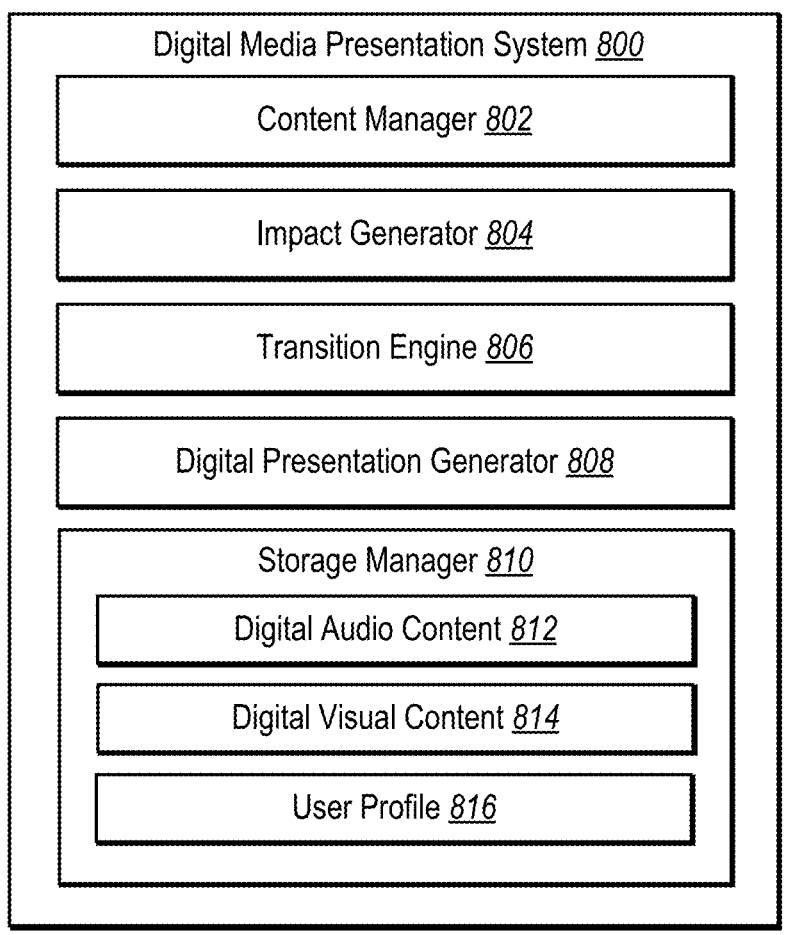
FIG. 8 illustrates a schematic diagram of a publishing system in accordance with one or more embodiments.

Turning now to FIG. 8, additional detail will be provided regarding components and capabilities of the digital media presentation system. In particular, FIG. 8 illustrates an embodiment of an exemplary digital media presentation system 800 (e.g., the digital media presentation system, discussed above). As shown, the digital media presentation system 800 may include, but is not limited to, a content generator 802, an impact manager 804, a transition engine 806, a digital presentation generator 808, and a storage manager 810. Moreover, the storage manager 810 may include digital audio content 812, digital visual content 814, and user profile 816.

Each of the components 802-810 of the digital media presentation system 800 and their corresponding elements (as shown in FIG. 8) may be in communication with one another using any suitable communication technologies. It will be recognized that although components 802-810 of the digital media presentation system 800 and their corresponding elements are shown to be separate in FIG. 8, any of components 802-810 and their corresponding elements may be combined into fewer components, such as into a single facility or module, divided into more components, or configured into different components as may serve a particular embodiment.

The components 802-810 of the digital media presentation system 800 and their corresponding elements can comprise software, hardware, or both. For example, the components 802-810 and their corresponding elements can comprise one or more instructions stored on a computer-readable storage medium and executable by processors of one or more computing devices. When executed by the one or more processors, the computer-executable instructions of the digital media presentation system 800 can cause a client device and/or a server device to perform the methods described herein. Alternatively, the components 802-810 and their corresponding elements can comprise hardware, such as a special purpose processing device to perform a certain function or group of functions. Additionally or alternatively, the components 802-810 and their corresponding elements can comprise a combination of computer-executable instructions and hardware.

Furthermore, the components 802-810 may, for example, be implemented as one or more stand-alone applications, as one or more modules of an application, as one or more plug-ins, as one or more library functions or functions that may be called by other applications, and/or as a cloud-computing model. Thus, the components 802-810 may be implemented as a stand-alone application, such as a desktop or mobile application. Furthermore, the components 802-810 may be implemented as one or more web-based applications hosted on a remote server. Alternatively or additionally, the components 802-810 may be implemented in a suit of mobile device applications or "apps." To illustrate, the components 802-810 may be implemented in a publishing application, including but not limited to ADOBE VIBE, ADOBE PHOTOSHOP, ADOBE ELEMENTS. "ADOBE," "VIBE," "PHOTOSHOP," and "ELEMENTS" are either registered trademarks or trademarks of Adobe Systems Incorporated in the United States and/or other countries.

As mentioned above, and as illustrated in FIG. 8, the digital media presentation system 800 includes the content manager 802. In one or more embodiments, the content manager 802 accesses, gathers, identifies, selects, arranges, analyzes, and provides content. For instance, the content manager 802 provides digital media content (e.g., digital audio content and digital media content) for the digital media presentation system 800.

The content manger 802 accesses digital media content from any available source. For instance, the content manager 802 accesses digital media content from a client device (e.g., from the storage manager 810, digital audio content 812, and digital visual content 814), from a local server (e.g., a home network connected to a local server providing digital media content), from a remote server (e.g., a remote server with a software application for providing digital media content), from a cloud service, or some other source. Thus, the content manager 802 can access digit audio content from a smartphone with a music playlist; from a third party music service provider accessible via a network; from a digital music storage medium (e.g., an audio compact disc), or some other source. Similarly, the content manager 802 can access digital visual content from a photo or video gallery on a smartphone, from a cloud-based storage service, or from some other source.

The content manager 802 also selects content. In particular, the content manager 802 selects content to utilize in a digital media presentation. For instance, the content manager 802 selects digital audio content and digital media content to utilize in a digital media presentation. The content manager 802 can select content based on a variety of factors. For instance, the content manager 802 can select digital audio content based on features of the digital audio content (e.g., genre, type, audio characteristics), user preference, utilization (e.g., frequency that a user listens to the digital audio content), features of digital visual content, user input, or other factors. Similarly, the content manager 802 can select digital visual content based on user preference, features of digital audio content, the features or contents of the digital visual content (e.g., individuals or objects portrayed in the digital visual content), date or time associated with the digital visual content, a location associated with the digital visual content, user input, or other factors.

In one or more embodiments, the content manager 802 also arranges content. In particular, the content manager 802 arranges digital audio content in a sequence. For instance, the content manager 802 arranges digital audio content in a sequence to display in conjunction with digital audio content. Similarly, the content manager 802 arranges a plurality of digital audio content items in a sequence to play while displaying digital visual content. The content manager 802 may arrange content based on a variety of factors. For instance, the content manager 802 arranges digital audio and digital visual content based on features of the digital audio content, user preference, utilization, features of digital visual content, user input, date or time, location, user input, or other factors.

In one or more embodiments, the content manager 802 also analyzes content. For instance, the content manager 802 analyzes digital audio content or digital visual content. In particular, the content manager 802 can analyze digital audio content or digital visual content and detect features of the digital audio content or digital visual content.

For instance, in one or more embodiments the content manager 802 analyzes digital visual content and identifies individuals or objects portrayed in the digital visual content. In particular, in one or more embodiments the content manager 802 includes facial recognition and/or object recognition technology. Thus, the content manager 802 can identify individuals, such as a user, friends, family, relations, or other individuals portrayed in digital visual content. Similarly, the content manager 802 can identify objects, such as monuments, locations, vegetation, vehicles, structures, homes, mountains or other objects portrayed in digital visual content. Similarly, in one or more embodiments the content manager 802 analyzes digital visual content and identifies other features. For example, the content manager 802 can identify colors, brightness, hues, quality, size, length, or other features of digital visual content. Moreover, optionally, the content manager 802 analyzes digital audio content and identifies features of the digital audio content. For example, in one or more embodiments the content manager 802 can analyze digital audio content and identify genre, type, length, artist, quality, or other features of digital audio content.

Moreover, as shown in FIG. 8, the digital media presentation system 800 also includes the impact generator 804. The impact generator 804 can calculate, generate, detect, identify, and determine impact of digital audio content. In particular, the impact generator 804 can calculate one or more impact values with regard to digital audio content.

For example, as described in greater detail above, the impact generator 804 receives digital audio content (e.g., from content manager 802) and detects one or more measures of energy associated with the digital audio content. For instance, the impact generator 804 determines amplitudes corresponding to frequencies at particular time periods associated with the digital audio content.

Moreover, the impact generator 804 calculates impact values based on one or more measures of energy. In particular, the impact generator 804 calculates a change in one or more measures of energy over time. For example, the impact generator 804 calculates a difference in a measure of energy over time in relation to a measure of energy at a particular point in time. More specifically, the impact generator 804 calculates range impact values corresponding to a specific range (e.g., a frequency range). The impact generator 804 can also calculate impact values at particular time periods (e.g., by adding range impact values at a particular time period together).

To calculate impact values, the impact generator 804 can also modify one or more measures of energy. For instance, the impact generator 804 applies one or more weighting curves, calculate a centroid with regard to a measure of energy associated with the digital audio content, normalize measures of energy with regard to digital audio content (e.g., normalize based on a centroid), apply one or more curves (e.g., gamma values) to a measure of energy, and otherwise modify measures of energy to calculate impact values.

The impact generator 804 can also calculate specific types of impact. For instance, the impact generator 804 calculates impact with regard to specific measures of energy, such as percussive impact, harmonic impact, or lyrical impact. For example, the impact generator 804 applies one or more filters to isolate certain measures of energy (e.g., percussive energy, harmonic energy, or lyrical energy) and calculate impact values based on the filtered measures of energy.

As illustrated in FIG. 8, the digital media presentation system 800 also includes the transition engine 806. The transition engine 806 can identify, determine, calculate, assign, or generate one or more transition points. In particular, the transition engine 806 can utilize impact values (e.g., impact values from the impact generator 804) to identify one or more transition points. More specifically, the transition engine 806 identifies transition points within digital audio content for utilization in syncing digital visual content with digital audio content as part of a digital media presentation.

As described above, in one or more embodiments, the transition engine 806 utilizes one or more decaying masking thresholds to identify transition points. For instance, the transition engine 806 can apply an initial decaying masking threshold directed to certain auditory capabilities or preferences. More specifically, the transition engine 806 can applying a decaying masking threshold that filters repetitive audio events and/or accounts for relative reduction in impact experienced by listeners after a significant audio event.

Moreover, the transition engine 806 can apply a second decaying masking threshold directed to certain visual capabilities or preferences. For instance, the transition engine 806 can apply a second decaying masking threshold that filters impact events that are too close in time for users to visually comprehend (e.g., too close for users to comfortably process digital visual content). Similarly, the transition engine 806 can apply a second decaying masking threshold that accounts for decreased interest in digital visual content experienced by a user over time.

Accordingly, the transition engine 806 applies decaying masking thresholds that begin at an initial threshold value, decay at a decay rate until intersecting one or more functions or values (e.g., intersecting impact values), expand based on the intersection (e.g., expand at a certain rate or by a certain amount), and then continue to decay. Moreover, the transition engine 806 modifies the initial threshold value, the decay rate, the expansion rate (and/or amount), and other parameters between and among decaying masking thresholds.

The transition engine 806 can identify transition points by comparing the decaying masking threshold to one or more values. For instance, the transition engine 806 identifies transition points by comparing the decaying masking threshold to impact values, values derived from impact values (e.g., audio interest values), or other values. More specifically, in one or more embodiments, the transition engine 806 identifies transition points based on intersections between the decaying masking threshold and other values (e.g., impact values, audio interest values, or other values).

The transition engine 806 can also generate multiple types of transition points. For instance, the transition engine 806 can identify transition points corresponding to a change between two or more digital visual content items (e.g., asset transitions), transition points corresponding to a change between two more types of digital visual content items, transition points corresponding to a change between modifications to a digital visual content item (e.g., micro-transitions), or other transitions points.

The transition engine 806 can also identify transition effects. In particular, the transition engine 806 can apply various transition effects to digital visual content at transition points. For instance, the transition engine 806 can change the display of a digital content item, display a graphic after a first digital visual content item and before a second digital visual content item, or provide some other transition effect.

As discussed, the transition engine 806 identifies one or more transition points. The transition engine 806 can also modify one or more parameters in identifying transition points. For instance, the transition engine 806 can modify parameters with regard to a decaying masking threshold based on a variety of factors. For instance, the transition engine 806 can modify parameters with regard to the decaying masking threshold based on one or more features of digital visual content (e.g., features identified by the content manager 802), based on a comparison between digital visual content items, based on a type of transition point, based on a type of transition effect, based on size and/or quality of digital visual content, or other factors.

For example, the transition engine 806 can modify the decaying masking threshold parameters (e.g., initial threshold value, decay rate, expansion rate or amount, minimum threshold, etc.) based on the contents of digital visual items. Specifically, the transition engine 806 can modify parameters based on individuals or objects portrayed in digital visual content.

Moreover, as illustrated in FIG. 8, the digital media presentation system 800 also includes the digital presentation generator 808. The digital presentation generator 808 can create, display, generate, or provide one or more digital media presentations. For example the digital presentation generator 808 can combine digital audio content and digital visual content (i.e., content provided by the content manager 802) into a digital media presentation.

In particular, the digital presentation generator 808 can create and display a digital media presentation based on transition points (e.g., transition points identified by the transition engine 806). For instance, the digital media presentation generator 808 can sync audio content and digital visual content based on identified transition points. Thus, for example, the digital presentation generator 808 can provide an image for display to a display device, provide a song for presentation via an audio playing device, and, while the song is playing, modify the image at an identified transition point in the song.

In addition, as illustrated in FIG. 8, the digital media presentation system 800 also includes the storage manager 810. The storage manager 810 maintains data for the digital media presentation system 800. The storage manager 810 can maintain data of any type, size, or kind, as necessary to perform the functions of the digital media presentation system 800.

As illustrated, the storage manager 810 includes digital audio content 812. Digital audio content 812 may include any digital audio content described herein. For example, the digital audio content 812 may include digital audio content gathered by the content manager 802, digital audio content previously utilized by the digital media presentation system 800, digital audio content accessed or maintained by a user on a client device, or any other digital audio content 812.

In addition, as illustrated in FIG. 8, the storage manager 810 also includes digital visual content 814. Digital visual content 814 may include any digital visual content described herein. For instance, the digital visual content 814 may include digital visual content gathered by the content manager 802, digital visual content previously utilized by the digital media presentation system 800, digital visual content access or maintained by a user on a client device, or any other digital visual content.

Moreover, as illustrated in FIG. 8, the storage manager 810 also includes user profile 816. The user profile 816 can store data related to one or more users of the digital media presentation system 800. For example, the user profile 816 may include information regarding utilization of the digital media presentation system 800, information regarding utilization of one or more devices, demographic information, user input previously provided by one or more users, user preferences with regard to digital audio content and/or digital visual content, or other information regarding one or more users.

Various components of the digital media presentation system 800 utilize the user profile 816 to perform its functions. For example, the content analyzer 802 may utilize the user profile 816 to select and arrange digital audio content and/or digital visual content; the impact generator 804 may utilize the user profile 816 to select one or more parameters in calculating impact values; and the transition engine 806 may utilize the user profile 816 to select one or more transition points.

Figure 9:
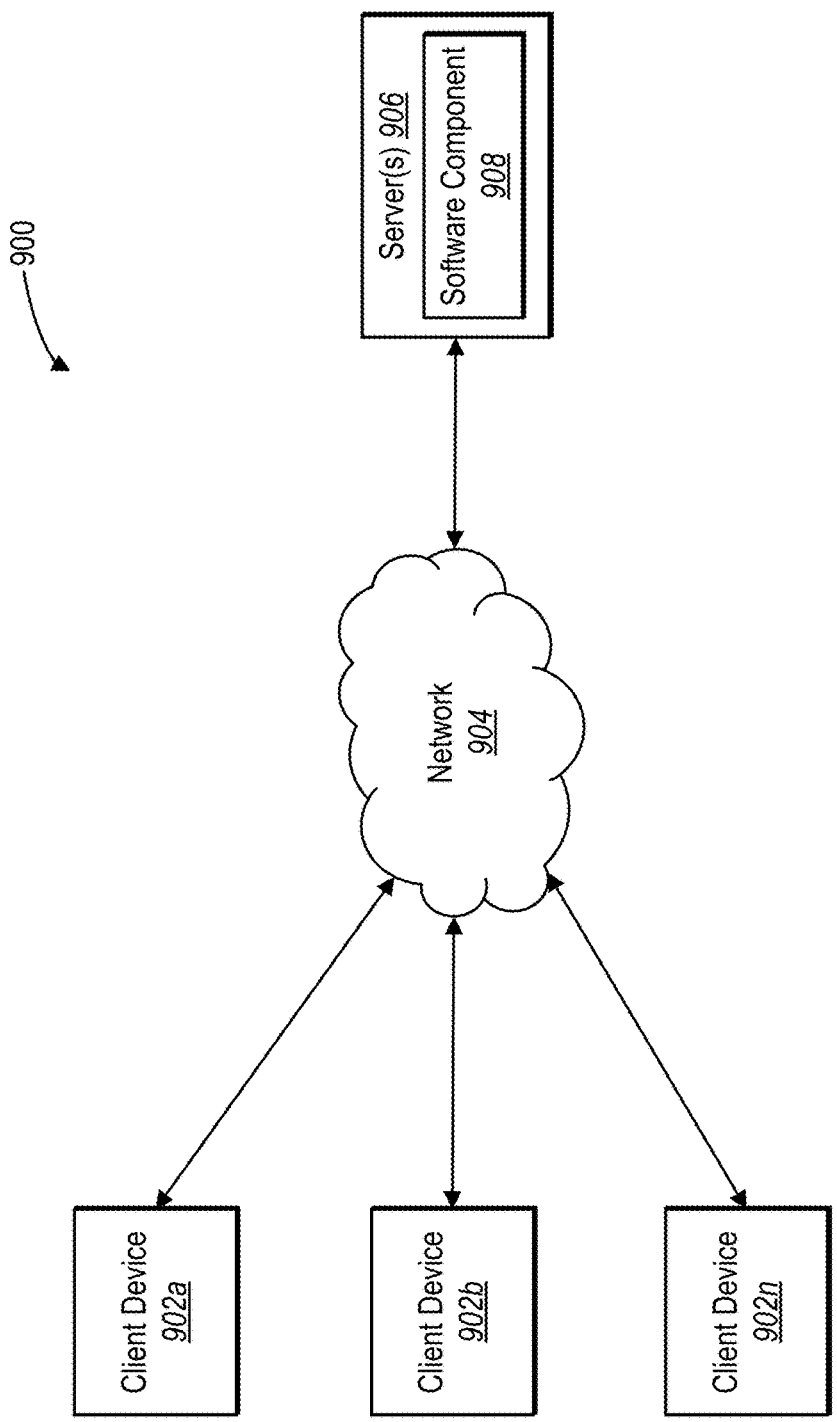
FIG. 9 illustrates a schematic diagram of an exemplary environment in which the publishing system can operate in accordance with one or more embodiments.

FIG. 9 illustrates a schematic diagram of one embodiment of an exemplary environment 900 in which the digital media presentation system 800 can operate. In one or more embodiments, the exemplary environment 900 includes one or more client devices 902a, 902b, . . . 902n, a network 904, and server(s) 906 containing a software component 908. The network 904 may be any suitable network over which the computing devices can communicate. Example networks are discussed in more detail below with regard to FIG. 11.

As illustrated in FIG. 9, the environment 900 may include client devices 902a-902n. The client devices 902a-902n may comprise any computing device. For example, client devices 902a-902n may comprise one or more personal computers, laptop computers, mobile devices, mobile phones, tablets, special purpose computers, TVs, or other computing devices, including computing devices described below with regard to FIG. 11.

In addition, the environment 900 may also include the server(s) 906. The server(s) 906 may generate, store, receive, and transmit any type of data, including digital audio content 812 and/or digital visual content 814. For example, the server(s) 906 may transmit data to a client device, such as client device 902a. The server(s) 906 can also transmit electronic messages between one or more users of the environment 900. In one example embodiment, the server(s) 906 comprise a content server. The server(s) 906 can also comprise a communication server or a web-hosting server. Additional details regarding the server(s) 906 will be discussed below with respect to FIG. 11.

As mentioned, in one or more embodiments, the server(s) 906 can include the software component 908. In particular, the software component 908 can comprise an application running on the server(s) 906 or a portion of a software application that can be downloaded from the server 906. For example, the software component 908 can include a web hosting application that allows the client devices 902a-902n to interact with content hosted at the server 906. To illustrate, in one or more embodiments of the exemplary environment 900, one or more client devices 902a-902n can access a webpage supported by the server 906. In particular, the client device 902a can run a web application (e.g., a web browser) to allow a user to access, view, and/or interact with a webpage or website hosted at the server 906.

Although FIG. 9 illustrates a particular arrangement of the client devices 902a-902n, the network 904, the server(s) 906, and the software component 908, various additional arrangements are possible. For example, while FIG. 9 illustrates multiple separate client devices 902a-902n communicating with the server(s) 906 via the network 904, in one or more embodiments a single client device may communicate directly with the server 906, bypassing the network 904.

Similarly, although the environment 900 of FIG. 9 is depicted as having various components, the environment 900 may have additional or alternative components. For example, the digital media presentation system 800 can be implemented on a single computing device. In particular, the digital media presentation system 800 may be implemented in whole by the client device 902a or the server(s) 906.

By way of example, in one or more embodiments the client device 902a can work in conjunction with the server(s) 906 and/or the software component 908 to download, stream, or otherwise access, view, and/or interact with content hosted by the server(s) 906. The client device 902a can identify digital audio content and digital visual content for utilization in a digital media presentation. Moreover, as described in detail above, the client device 902a can calculate transition points, sync digital audio content and digital visual content, and generate one or more digital media presentations.

Additionally or alternatively, in one or more embodiments the server(s) 906 and the software component 908 can allow a user to select desired content (e.g., digital audio content and digital visual content) hosted by the server(s) 906. Moreover, the server(s) 906 can calculate one or more transition points, sync digital audio content and digital visual content, and generate one or more digital media presentations. The server(s) 906 may then communicate, provide, send, or download to the client device 902a, via the network 904, the one or more digital media presentations. Moreover, the client device 902a may communicate, direct, or indicate to the server(s) 906 to send the one or more digital media presentations to client devices 902b-902n (and/or users associated with client devices 902b-902). In response, the server(s) 906 may transmit, send, or otherwise provide the one or more digital media presentations to the client devices 902b-902n.

Figure 10:
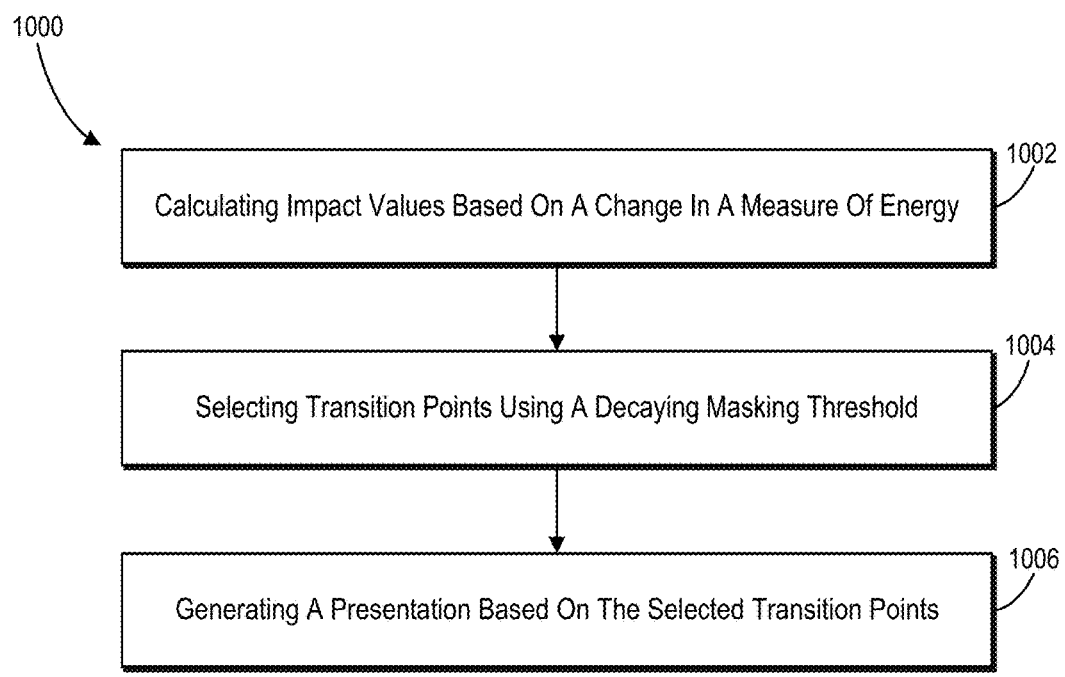
FIG. 10 illustrates a flowchart of a series of acts in a method of generating digital media presentations in accordance with one or more embodiments.
Figure 11:
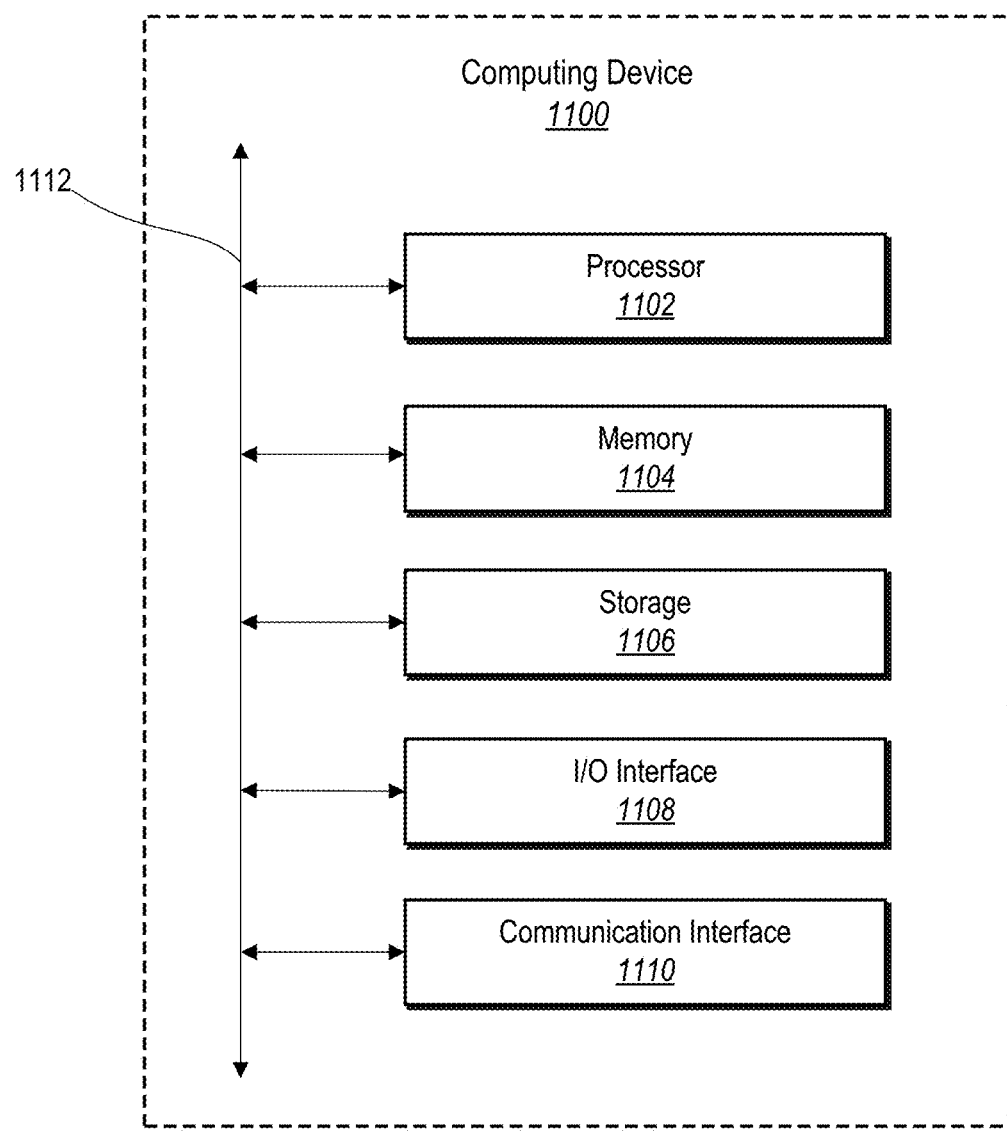
FIG. 11 illustrates a block diagram of an exemplary computing device in accordance with one or more embodiments.

FIGS. 1-9, the corresponding text, and the examples, provide a number of different systems and devices that allows a user to facilitate creation of one or more digital media presentations. In addition to the foregoing, embodiments can also be described in terms of flowcharts comprising acts and steps in a method for accomplishing a particular result. For example, FIGS. 10 and 11 illustrate flowcharts of exemplary methods in accordance with one or more embodiments. The methods described in relation to FIGS. 10 and 11 may be performed with less or more steps/acts or the steps/acts may be performed in differing orders. Additionally, the steps/acts described herein may be repeated or performed in parallel with one another or in parallel with different instances of the same or similar steps/acts.

FIGS. 10 illustrates a flowchart of a series of acts in a method 1000 of creating one or digital media presentations in accordance with one or more embodiments. In one or more embodiments, the method 1000 is performed in a digital medium environment that includes the digital media presentation system 800. The method 1000 is intended to be illustrative of one or more methods in accordance with the present disclosure, and is not intended to limit potential embodiments. Alternative embodiments can include additional, fewer, or different steps than those articulated in FIG. 10.

The method 1000 includes an act 1002 of calculating impact values based on a change in a measure of energy. In particular, the act 1002 can include calculating impact values for a plurality of time periods associated with digital audio content by calculating a change in a measure of energy associated with the time periods. In addition, the act 1002 may also include calculating a change in the measure of energy between a first time period in the plurality of time periods and a second time period in the plurality of time periods in relation to an amount of the measure of energy associated with the digital audio content at the second time period.

Similarly, the act 1002 can also include dividing the plurality of time periods associate with the digital audio content into a plurality of ranges, each range of the plurality of ranges in a first time period corresponding to a range of the plurality of ranges in a second time period, and for each range in the second time period, calculating the difference between a measure of energy associated with the range from the digital audio content in the second time period and a measure of energy associated with the corresponding range from the digital audio content in the first time period. Moreover, the act 1002 may include for each range in the second time period, calculating a range impact value by multiplying the calculated difference between the measure of energy associated with the range from the digital audio content in the second time period and the measure of energy associated with the corresponding range from the digital audio content in the first time period by the calculated measure of energy associated with the range from the digital audio content in the second time period, and calculating an impact value associated with the second time period by combining the range impact values.

In addition, the act 1002 may also include calculating a centroid of the measure of energy with regard to the digital audio content; normalizing the measure of energy based on the centroid; and applying a cure to the normalized measure of energy. Moreover, with regard to the act 1002, the measure of energy may comprise one or more of the following: amplitude, power, intensity, volume or loudness.

As illustrated in FIG. 10, the method 1000 also includes an act 1004 of selecting transition points using a decaying masking threshold. The act 1004 may also include selecting transition points based on the impact values in the digital audio content using a decaying masking threshold that decays until a first impact value is intersected, increases in response to the intersection of the first impact value, and decays again until a second impact values is intersected, wherein the intersected impact values are utilized to select transition points.

Similarly, the act 1004 may also include generating audio interest values by applying a first decaying masking threshold to the calculated impact values, the first decaying masking threshold decaying at a first rate. Moreover, the act 1004 may also include selecting transition points by applying a second decaying masking threshold to the audio impact values, the second decaying masking threshold decaying at a second rate different than the first rate.

Furthermore, the act 1004 may also include calculating audio interest values by comparing the decaying masking threshold and the impact values and applying a second decaying masking threshold that decays until a first audio interest value is intersected, expands in response to the intersection of the first audio interest value, and decays again until a second audio interest value is intersected, wherein the intersected audio interest values are utilized to select transition points. Moreover, in one or more embodiments of the act 1004, the decaying masking threshold decays at a first rate and the second decaying masking threshold decays at a second rate different than the first rate. Similarly, in one or more embodiments of the act 1004, the decaying masking threshold expands by a magnitude in proportion to a magnitude of the first impact value.

In addition, the act 1004 may also include detecting one or more characteristics of the digital visual content, and modifying at least one of the following based on the detected one or more characteristics of the visual content: a magnitude that the decaying masking threshold expands; a rate that the decaying masking threshold expands; a magnitude that the decaying asking threshold decays; or a rate at which the decaying masking threshold decays. Similarly, in one or more embodiments of the act 1004, the one or more characteristics of the digital visual content comprise at least one of the following: a user interaction with the digital visual content, an object portrayed in the digital visual content; an individual portrayed in the digital visual content, and a type of the digital visual content.

Moreover, as illustrated in FIG. 10, the method 1000 also includes an act 1006 of generating a presentation based on the selected transition points. In particular, the act 1006 may include generating a presentation of digital visual content by syncing the digital visual content with the digital audio content based on the selected transition points. In addition, the act 1006 may also include, based on the selected transition points, generating a presentation of digital visual content in conjunction with the digital audio content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 11 illustrates, in block diagram form, an exemplary computing device 1100 that may be configured to perform one or more of the processes described above. One will appreciate that the digital media presentation system 800 can comprise implementations of the computing device 1100. As shown by FIG. 11, the computing device can comprise a processor 1102, memory 1104, a storage device 1106, an I/O interface 1108, and a communication interface 1110. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them. In particular embodiments, processor(s) 1102 may include one or more internal caches for data, instructions, or addresses. As an example and not by way of limitation, processor(s) 1102 may include one or more instruction caches, one or more data caches, and one or more translation lookaside buffers (TLBs). Instructions in the instruction caches may be copies of instructions in memory 1104 or storage 1106.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to the computing device 1100. In particular embodiments, storage device 1106 is non-volatile, solid-state memory. In particular embodiments, storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1110. As an example and not by way of limitation, computing device 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1100 may include any suitable communication interface 1110 for any of these networks, where appropriate.

The computing device 1100 can further include a bus 1112. The bus 1112 can comprise hardware, software, or both that couples components of computing device 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

I claim:

1. In a digital medium environment for creating digital media presentations, a method of combining and presenting visual and audio media over time, comprising:
   determining impact values for a plurality of time periods associated with digital audio content based on a change in a measure of energy in the digital audio content between the plurality of time periods;
   generating audio interest values by applying a first decaying masking threshold to the determined impact values, the first decaying masking threshold decaying at a first rate;
   analyzing the audio interest values generated by the first decaying masking threshold via a second decaying masking threshold to identify transition points, the second decaying masking threshold decaying at a second rate different than the first rate; and
   based on the identified transition points, generating a presentation of digital visual content in conjunction with the digital audio content.

2. The method as recited in claim 1, wherein the first decaying masking threshold decays until a first impact value is intersected, expands in response to the intersection of the first impact value, and decays again until a second impact value is intersected.

3. The method as recited in claim 2, further comprising generating the audio interest values based on a difference between the impact values and the first decaying masking threshold.

4. The method as recited in claim 3, wherein the second decaying masking threshold decays until a first audio interest value of the audio interest values is intersected, expands in response to the intersection of the first audio interest value, and decays again until a second audio interest value of the audio interest values is intersected.

5. The method as recited in claim 4, further comprising identifying the transition points by determining a first transition point based on the first audio interest value and determining a second transition point based on the second audio interest value.

6. The method as recited in claim 1, wherein generating the presentation comprises:
   associating a first digital visual content item with the digital audio content for a first period of time before a first transition point; and
   associating a second digital visual content item with the digital audio content for a second period of time after the first transition point.

7. The method as recited in claim 1, further comprising selecting a transition effect based on one or more of the determined impact values.

8. The method as recited in claim 1, wherein determining the impact values comprises filtering the digital audio content to isolate a particular measure of energy, wherein the particular measure of energy consists of at least one of: percussive energy, harmonic energy, or lyrical energy.

9. The method as recited in claim 8, wherein determining the impact values further comprises determining energy-specific impact values based on changes in the particular measure of energy between the plurality of time periods.

10. A non-transitory computer readable medium storing instructions thereon that, when executed by at least one processor, cause a computer system to:

determine impact values for a plurality of time periods associated with digital audio content based on a change in a measure of energy in the digital audio content between the plurality of time periods;

generate audio interest values by applying a first decaying masking threshold to the determined impact values;

analyzing the audio interest values generated by the first decaying masking threshold via a second decaying masking threshold to identify transition points; and based on the identified transition points, generate a presentation of digital visual content in conjunction with the digital audio content.

11. The non-transitory computer readable medium of claim 10:

wherein the first decaying masking threshold decays until a first impact value is intersected, expands in response to the intersection of the first impact value, and decays again until a second impact value is intersected; and further comprising instructions that, when executed by the at least one processor, cause the computer system to generate the audio interest values based on a difference between the impact values and the first decaying masking threshold.

12. The non-transitory computer readable medium of claim 11, wherein the second decaying masking threshold decays until a first audio interest value of the audio interest values is intersected, expands in response to the intersection of the first audio interest value, and decays again until a second audio interest value of the audio interest values is intersected.

13. The non-transitory computer readable medium of claim 12, further comprising instructions that, when executed by the at least one processor, cause the computer system to identify the transition points by determining a first transition point based on the first audio interest value and determining a second transition point based on the second audio interest value.

14. The non-transitory computer readable medium of claim 13, further comprising instructions that, when executed by the at least one processor, cause the system to generate the presentation by:

associating a first digital visual content item with the digital audio content for a first period of time before the first transition point; and associating a second digital visual content item with the digital audio content for a second period of time after the first transition point.

15. The non-transitory computer readable medium of claim 10, further comprising instructions that, when executed by the at least on processor, cause the computer system to determine a duration of a transition effect based on one or more of the determined impact values.

16. The non-transitory computer readable medium of claim 10, further comprising instructions that, when executed by the at least one processor, cause the computer system to determine the impact values by:

filtering the digital audio content to isolate a particular measure of energy, wherein the particular measure of energy consists of at least one of: percussive energy, harmonic energy, or lyrical energy; and determining energy-specific impact values based on changes in the particular measure of energy between the plurality of time periods.

17. A system comprising:

at least one processor;

at least one non-transitory computer readable storage medium storing instructions thereon that, when executed by the at least one processor, cause the system to:

determine impact values associated with digital audio content based on a change in a measure of energy in the digital audio content;

generate audio interest values by applying a first decaying masking threshold to the determined impact values;

analyzing the audio interest values generated by the first decaying masking threshold via a second decaying masking threshold to identify transition points; and based on the identified transition points, generate a presentation of digital visual content in conjunction with the digital audio content.

18. The system of claim 17, wherein the second decaying masking threshold decays until a first audio interest value of the audio interest values is intersected, expands in response to the intersection of the first audio interest value, and decays again until a second audio interest value of the audio interest values is intersected.

19. The system of claim 18, further comprising instructions that, when executed by the at least one processor, cause the system to:

identify the transition points by determining a first transition point based on the first audio interest value and determining a second transition point based on the second audio interest value; and generate the presentation by:

associating a first digital visual content item with the digital audio content for a first period of time before the first transition point; and associating a second digital visual content item with the digital audio content for a second period of time after the first transition point.

20. The system of claim 17, further comprising instructions that, when executed by the at least one processor, cause the system to determine the impact values by:

filtering the digital audio content to isolate a particular measure of energy, wherein the particular measure of energy consists of at least one of: percussive energy, harmonic energy, or lyrical energy; and determining energy-specific impact values based on changes in the particular measure of energy between a plurality of time periods.

* * * * *